United States Patent
Warburton et al.

(10) Patent No.: US 7,065,473 B2
(45) Date of Patent: *Jun. 20, 2006

(54) METHOD AND APPARATUS FOR IMPROVING RESOLUTION IN SPECTROMETERS PROCESSING OUTPUT STEPS FROM NON-IDEAL SIGNAL SOURCES

(75) Inventors: William K. Warburton, 1300 Mills St., Menlo Park, CA (US) 94025; Michael Momayezi, Oakland, CA (US)

(73) Assignee: William K. Warburton, Menlo Park, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 10/690,470

(22) Filed: Oct. 20, 2003

(65) Prior Publication Data

US 2004/0158440 A1 Aug. 12, 2004

Related U.S. Application Data

(63) Continuation-in-part of application No. 10/429,170, filed on May 1, 2003, which is a continuation of application No. 09/643,705, filed on Aug. 21, 2000, now Pat. No. 6,587,814.

(60) Provisional application No. 60/151,020, filed on Aug. 27, 1999.

(51) Int. Cl.
*H04B 15/00* (2006.01)
*G01D 15/00* (2006.01)
(52) U.S. Cl. ............................ 702/190; 702/57; 702/85
(58) Field of Classification Search ................. 702/32, 702/57, 70, 85, 86, 89, 90, 189–191, 194, 702/195, 197, 190; 250/252.1, 370.01; 505/161, 505/162
See application file for complete search history.

(56) References Cited

U.S. PATENT DOCUMENTS 3,700,876 A * 10/1972 Gray ........................... 708/813

(Continued)

FOREIGN PATENT DOCUMENTS

JP 2000316072 11/2000
WO WO 01/17103 3/2001

OTHER PUBLICATIONS

Aalseth et al., "Using pulse shape discrimination to sort individual energy deposition events in a germanium crystal", Journal of Radioanalytical and Nuclear Chemistry, vol. 233, Nos. 1-2 (1998) 119-123.

(Continued)

*Primary Examiner*—Marc S. Hoff
*Assistant Examiner*—Manuel L. Barbee
(74) *Attorney, Agent, or Firm*—Townsend and Townsend and Crew LLP

(57) ABSTRACT

A method and apparatus for processing step-like output signals (primary signals) generated by non-ideal, for example, nominally single-pole ("N-1P") devices. An exemplary method includes creating a set of secondary signals by directing the primary signal along a plurality of signal paths to a signal summation point, summing the secondary signals reaching the signal summation point after propagating along the signal paths to provide a summed signal, performing a filtering or delaying operation in at least one of said signal paths so that the secondary signals reaching said summing point have a defined time correlation with respect to one another, applying a set of weighting coefficients to the secondary signals propagating along said signal paths, and performing a capturing operation after any filtering or delaying operations so as to provide a weighted signal sum value as a measure of the integrated area $Q_{gT}$ of the input signal.

77 Claims, 12 Drawing Sheets

U.S. PATENT DOCUMENTS

| | | | |
|---|---|---|---|
| 4,314,343 A | 2/1982 | Tomlinson | |
| 4,529,308 A | 7/1985 | Rife | |
| 4,554,633 A | 11/1985 | Glover et al. | |
| 4,727,256 A | 2/1988 | Kumazawa | |
| 4,853,538 A | 8/1989 | Jackson | |
| 4,893,018 A | 1/1990 | Saitou | |
| 4,937,452 A | 6/1990 | Simpson et al. | |
| 4,968,889 A | 11/1990 | Hartwell et al. | |
| 5,021,664 A | 6/1991 | Hinshaw | |
| 5,132,963 A | 7/1992 | Ungerboeck | |
| 5,347,129 A | 9/1994 | Miller et al. | |
| 5,684,850 A | 11/1997 | Warburton | |
| 5,774,522 A | 6/1998 | Warburton | |
| 5,821,533 A | 10/1998 | Bingham et al. | |
| 5,872,363 A | 2/1999 | Bingham et al. | |
| 5,873,054 A | 2/1999 | Warburton et al. | |
| 5,889,869 A * | 3/1999 | Botros et al. | 381/71.11 |
| 6,310,349 B1 | 10/2001 | Wong et al. | |
| 6,374,192 B1 | 4/2002 | Brogle et al. | |
| 6,587,814 B1 | 7/2003 | Warburton et al. | |

OTHER PUBLICATIONS

Goulding et al., "Ballistic Deficit Correction in Semiconductor Detector Spectrometers", I.E.E.E: Trans. Nuclear Science, vol. 35, No. 1, (1988) 119-124.

Knoll, Glenn F., "Radiation Detection and Measurement, 2nd Ed." (J. Wiley, New York, 1989).

Radeka, V., "Trapezoidal Filtering of Signals from Large Germanium Detectors at High Rates", I.E.E.E. Trans. Nuclear Science, vol. NS-19 (1982) 412-428.

Raudorf et al., "Pulse Shape and Risetime Distribution Calculations for HPGe Coaxial Detectors", I.E.E.E. Trans. Nuclear Science, vol. NS-29, No. 1 (1982) 764-768.

Skulski et al., "Particle identification in CsI(Tl) using digital pulse shape analysis," Nuclear Instruments and Methods in Physics Research, A458 (2001) 759-771.

Stahle et al., "Design and performance of the Astro-E/XRF microcalorimeter array and anti-coincidence detector", in Proc. of the SPIE No. 3765, "EUV, X-ray and Gamma-ray Instrumentation for Astronomy X" (Denver, CO, Jul. 21-23, 1999), in press.

Takahashi et al., "A Multiparametric Waveform Analysis of GE Detector Signal Based on Fast ADC Digitizing Technique", I.E.E.E. Trans. Nuclear Science, vol. 41, No. 4, (1994) 1246-1249.

White, G., "Pulse Processing for Gamma Ray Spectrometry: a Novel Method and its Implementation", I.E.E.E. Trans. Nuclear Science, vol. 35, No. 1, (1988) 125-130.

* cited by examiner

METHOD AND APPARATUS FOR IMPROVING RESOLUTION IN SPECTROMETERS PROCESSING OUTPUT STEPS FROM NON-IDEAL SIGNAL SOURCES

CROSS-REFERENCE TO RELATED APPLICATIONS

This application is a continuation-in-part of U.S. patent application Ser. No. 10/429,170, filed May 1, 2003 (William K. Warburton and Michael Momayezi), which is continuation of U.S. patent application Ser. No. 09/643,705, filed Aug. 21, 2000 (William K. Warburton and Michael Momayezi), now U.S. Pat. No. 6,587,814, which claims priority from Provisional U.S. Patent Application No. 60/151,020, filed Aug. 27, 1999 (William K. Warburton and Michael Momayezi), all of whose disclosures are incorporated by reference in their entirety for all purposes.

STATEMENT AS TO RIGHTS TO INVENTIONS MADE UNDER FEDERALLY SPONSORED RESEARCH AND DEVELOPMENT

The U.S. Government has rights in this invention pursuant to Contract No. DE-FG03-97ER82510 awarded by the Department of Energy.

BACKGROUND OF THE INVENTION

The present invention relates generally to signal processing systems, and more particularly to processing the step-like output signals generated by devices with multiple poles and zeros (including non-ideal, nominally single-pole ("N-1P") devices as a subset) responding to possibly time-varying, pulse-like input signals of finite duration, wherein the goal is to recover the integrated areas of the input signals.

The specific embodiments described relate to processing step-like signals generated by detector systems in response to absorbed radiation or particles and, more particularly, to digitally processing such step-like signals in high resolution, high rate gamma ray (γ-ray) spectrometers with resistive feedback preamplifiers connected to large volume germanium detectors. The method also works well with gas proportional counters and scintillation detectors, to cite additional examples. The application of measuring the step-like output signals from γ-ray detector preamplifiers to measure the γ-rays' energies is given specific attention only because this was the area in which the method was first developed.

The techniques that we have developed solve this problem generally, and therefore should not be construed as being limited to this specific application. Any detection system, for example, that produces output current signals that are integrated by charge sensitive preamplifiers could be treated by these techniques, whether the detected quantities are light pulses, x-rays, nuclear particles, chemical reactions, or otherwise. The techniques, in fact, is not limited to "detector systems" per se, but are, in fact, general purpose signal processing techniques which may be broadly applied, once understood, to any device whose output signals that can be described in terms of multiple poles and zeros. The outputs from superconducting bolometers, for example, produce step-like signals that are readily treated by the invention, as do the outputs of photomultiplier tubes (PMTs) attached to scintillators having more than one decay time. The field of gamma spectroscopy, where 0.1% or less makes the difference between a bad and a good detector, however, provides particularly stringent tests of our techniques.

The term "step-like signal" also requires some discussion. The output of an ideal single-pole ("1-P") device to an ideal impulse (delta) function input, is an infinitely fast rise time followed by an exponential decay whose time constant $\tau_d$ is characteristic of the pole. Viewed on a time scale short compared to $\tau_d$, this output will look like a pure step, while, when viewed on a time scale long compared to $\tau_d$, it will look like a pulse. A real 1-P device output, however, will have a finite risetime, $\tau_r$, whose duration will be determined both by the nature of the device and, particularly, by the duration of its real input signal. Provided that $\tau_r$ is significantly shorter than $\tau_d$, a real 1-P device output signal, viewed on a time scale comparable to $\tau_d$, will then show a risetime region, whose shape may be difficult to describe mathematically, followed, after a period comparable to $\tau_r$, by an exponential decay with time constant $\tau_d$. The output of a device with multiple poles will be similar, except that the decay will be described by multiple time constants $\tau_i$, where I=1 for the first pole, 2 for the second, etc. The output of a N-1P device will also be similar, with additional distortions from added minor pole or zero terms. We will refer to such signals, viewed on this time scale, as "step-like" or "step-like pulses." A pulse displaying step-like nature is shown in FIG. 1B.

Gamma-Ray (γ-Ray) Detection Requirements

The detection and measurement of γ-ray energies is a well-established discipline whose primary goal is to accurately determine both the number and energies of γ-rays emitted from some target source. The requirements of good energy resolution and high count rate capability usually conflict, however, since count rates are enhanced by increasing detector volume, which increases output signal distortion and so degrades energy resolution. High count rates also degrade energy resolution directly due to practical problems in preamplifier design.

Description of the Problems

The field of γ-ray detection is highly developed. A fairly comprehensive introduction to the state of the art may be found in the volume "Radiation Detection and Measurement, 2nd Ed." by Glenn F. Knoll [KNOLL-1989]. Below we note only the issues relevant to the present invention. In the first section, we discuss how pole/zero cancellation errors introduce a second pole, spoiling the preamplifier's single pole response. In the second section, we examine how the finite input signal duration, in this case due to charge collection, distorts the preamplifier's output from the ideal.

Pole/Zero Cancellation Errors

FIG. 1A shows a typical solid state γ-ray spectrometer comprising a semiconductor detector diode 7 biased by a voltage supply 8 and connected to a preamplifier 10 comprising an amplifier 13 with a feedback capacitor C 15 and resistor R 17. As drawn, preamplifier 10 is a single pole circuit whose response to an impulse (delta function) input is $A \exp(-t/\tau_2)$, where $\tau_2 = RC$ and A is the area under the impulse. Because $\tau_2$ is typically of order 1 ms, which is too long for the following circuits, a pole/zero (P/Z) network 20 cancels the pole at $1/\tau_2$ and replaces it with a pole at $1/\tau_1$, where $\tau_1$ typically is 50 μs. Gain stage 22 then amplifies and buffers the preamplifier's output signal for shaping amplifier 23 which feeds multichannel analyzer (MCA) 24.

If the time duration of the current pulse arising from the charge deposited in detector 7 by a γ-ray absorption is very short compared to $\tau_1$, the output of stage 22 will be an exponentially decaying step whose amplitude is the pulse integral and proportional to the deposited charge. γ-ray spectrometers are therefore designed to measure these step amplitudes to measure the charge deposited by the absorbed γ-ray. Other forms of radiation, including neutrons, alpha and beta particles, and x-rays behave similarly and their energies are measured the same way.

Commonly, however, both the input's finite duration and the pole-zero circuit's imperfections distort the preamplifier's response, destroying the proportionality between the output step's amplitude and the deposited charge and so degrading the system's energy resolution. Imperfections in P/Z network 20 arise from difficulties in precisely canceling the $\tau_2$ component, leaving a small residual fraction, of order 1–2%, in the output signal. FIG. 1B shows a 5% residual $\tau_2$ component for ease of viewing: an exponential decay signal 25 with time constant $\tau_2$, input to the P/Z network 20, produces either output signal 27 or 29, depending upon whether the residual $\tau_2$ term is positive or negative.

These $\tau_2$ residuals are particularly bothersome at high counting rates, where each signal step rides upon a $\tau_2$ background from all preceding steps. As these arrive randomly, the resulting baseline bias also fluctuates randomly in time, which the spectroscopy amplifier's baseline restoration circuit cannot track well. These terms, which may only be a few tenths of 1%, become a significant resolution degradation at 1 MeV where 0.05% energy resolution is desired.

Signal Risetime Fluctuations and Ballistic Deficit

FIG. 2 shows a preamplifier 10 front end with a cross sectional view of the detector 7 of FIG. 1, for the common coaxial geometry, The dashed lines show electric field line within the detector body 30, which vary considerably with local geometry. Two factors cause charge collection time variations within the detector and thus risetime variations in the preamplifier's 10 signal output: 1) the difference between carrier velocities; and 2) the existence of different path lengths within the detector. RAUDORPH-1982 describes these issues. These risetime variations produce ballistic deficit by two paths, one direct, one indirect. The direct effect is well understood, per GOULDING-1988: the output filter's response varies with the time dependent shape of the charge arrival, being the convolution of the two. A trapezoidal filter greatly reduces this effect in the absence of exponential decay.

The indirect effect source of ballistic deficit is due to fluctuations in charge loss through the feedback resistor with differing risetime, as seen in FIG. 3A with two risetimes, 40 and 42, where FIG. 3B enlarges their peak regions. The slower risetime signal loses less charge and thus is larger once charge collection is complete. Even filters which ignore the charge collection region are still sensitive to this lost charge effect, and relatively small errors of this size can substantially degrade resolution. For a trapezoidal filter, the collection time difference shown FIG. 3B produces a 0.2% amplitude difference (2,000 eV at 1 MeV) which will degrade ideal 1.7 keV resolution to 2.6 keV. Ballistic deficit errors must therefore be reduced to less than 0.05% to obtain ideal spectrometer resolutions at 1 MeV.

Charge Trapping Losses

Charge trapping also produces errors in γ-ray energy measurements since trapped charges are lost to the measurement. The present invention does not seek to address this problem.

Scintillators with Multiple Decay Times

Scintillators generally convert the energy deposited in them by a photon or particle into a population of excited states that then decay, emitting light as they do so. The total light emitted may then be taken as a measure of the energy deposited. Light output from a scintillator is therefore also "step-like" in the sense we are discussing. In addition, certain scintillators possess more than one type of excited state, so that their decay is characterized by multiple decay times. CsI(T1), for example, has two decay times of about 600 ns and 4 μs, so that its output signals formally resemble trace 27 in FIG. 1B (the real time scale is about a factor of 100 faster, of course).

Generalizations

It is important to note that the pole-zero cancellation errors described above do not arise from the preamplifier's use in γ-ray spectroscopy, but are a generic problem in low noise, charge sensitive preamplifiers. Similarly, while the described risetime fluctuations described above were attributed to the geometry and construction of large volume Ge detectors, it is clear that such problems fundamentally arise from interactions between the finite charge collection time and the electrical characteristics of the preamplifier and not from the physics of the collection processes. Geometric heat flow variations in the photon absorbing mass produce similar effects in the superconducting bolometers mentioned earlier. Risetime issues are therefore a potentially general problem as well, and may need to be corrected for in other, non-γ-ray, detectors whenever the highest measurement accuracies are required. The methods we describe offer just that capability. Further, the terminology "single-pole" or "multiple-poles or zeros" comes from the LaPlace Transform treatment of differential equations describing time variant phenomena. Any device which shows "single-pole" behavior, for example, will display exponential time decay in response to an impulse input and, therefore, may be, for example, mechanical, thermal, chemical, or magnetic in nature in addition to the electronic case presented here. Our method can be directly applied to these devices as well, as will be apparent from the teachings herein.

Existing Correction Schemes

The prior art deals with pole/zero errors in two ways: first, by canceling $\tau_2$ as accurately as possible; and, second, with baseline restoration schemes which try to track the shaping amplifier's "no signal" output as closely as possible, an approach which degrades as rates becomes high. We have not found any approaches which measure and/or correct for the effect directly.

Over the years, various heuristic schemes have been developed which attempt to compensate for ballistic deficit. RADEKA-1982 introduced trapezoidal filtering and developed a time-variant implementation, using a gated filter following a semi-Gaussian shaper, that provided significant resolution improvements. WHITE-1988 proposed a different gated integration approach using a series switch to excise the charge collection region out of the preamplifier signal entirely. The final circuit was complex and had enhanced deadtime problems. GOULDING-1988, RAUDORF-1982, and SIMPSON-1990 disclose schemes that depend on directly measuring the signal's risetime $t_r$ and correcting the energy filter output by a term like $t_r{}^n$. These approaches are complex to implement and require precise expert adjustments to operate. The underlying assumptions are not particularly valid and improvements in energy resolution have been modest in practice.

HINSHAW-1991 and KUMAZAWA-1998 describe attempts to correct for ballistic deficit by capturing peak amplitudes from two filters which respond to the ballistic deficit differently, one an energy measuring filter and one a differentiating (or bipolar shaping) filter. Typically a significant fraction of their difference in peak heights is added to the energy filter's peak to correct it.

Related Art

There is some related art wherein the details of the shapes of the preamplifier output signals are sampled digitally and used either to distinguish between different types of particles absorbed in the detector (e.g., MILLER-1994) or to distinguish between single and multiple interaction events in large germanium detectors. See, for example, TAKAHASHI-1994 and AALSETH-1998.

WARBURTON-1997, WARBURTON-1998, and WARBURTON-1999 describe methods for implementing digital filtering and x-ray spectroscopy. While they do not address the issues under consideration, some of their filtering techniques will be employed in the present invention and are referenced in the specification.

SUMMARY OF THE INVENTION

The present invention provides techniques for measuring a step-like output signal from a nominally single-pole (N-1P) device or a device with multiple poles and zeros in response to a pulse-like input signal to determine the integrated area of the input signal. The invention particularly addresses the possibility that a single-pole device deviates from ideality due to the presence of additional poles, zeros and/or a DC offset and that the input pulses may have finite time durations and variable amplitudes. In a specific example, the measurement determines collected detector charges from step-like preamplifier output signals in the presence of both risetime fluctuations and imprecise pole/zero cancellations. The invention can be implemented with digital, analog, or hybrid circuitry.

One aspect of the invention measures the integrated area $Q_{gT}$ of a pulse-like input signal applied to a device characterized by one or more decay time constants in the device's impulse response function. This is accomplished by measuring a step-like output signal, referred to as the primary signal, provided by the device in response to the pulse-like input signal. In this aspect of the invention, the primary signal is directed into a plurality of signal paths to create a set of secondary signals, the secondary signal in at least one of the signal paths is filtered and/or delayed, a set of weighting coefficients are applied to the secondary signals within the signal paths, and the secondary signals are summed to provide a time correlated, weighted filter sum signal. In some implementations, the secondary signals are all summed at a single summation point, while in others, the secondary signals are summed at a plurality of summation points. The secondary signals are captured in at least one capturing operation after any filtering or delaying operations to produce a value of the time correlated, weighted filter sum signal, following the capturing and summing operations, that is a measure of the integrated area $Q_{gT}$ of the input signal.

Another aspect of the invention provides a method for measuring the integrated area $Q_{gT}$ of a pulse-like input signal applied to a device characterized by one or more decay time constants in the device's impulse response function by measuring a step-like output signal, referred to as the primary signal, provided by the device in response to the pulse-like input signal. In this aspect, the method comprises creating a set of secondary signals by directing the primary signal into a plurality of signal paths, performing a filtering or delaying operation in at least one of the signal paths, applying a set of weighting coefficients to the secondary signals within the signal paths, summing the secondary signals to provide a time correlated, weighted filter sum signal; and performing at least one capturing operation after any filtering or delaying operations to produce a value of the time correlated, weighted filter sum signal, following the capturing and summing operations, that is a measure of the integrated area $Q_{gT}$ of the input signal.

Another aspect of the invention provides apparatus for measuring the integrated area $Q_{gT}$ of a pulse-like input signal applied to a device characterized by one or more decay time constants in the device's impulse response function by measuring a step-like output signal, referred to as the primary signal, provided by the device in response to the pulse-like input signal. The apparatus comprises a plurality of signal paths that receive the primary signal (the signals traveling along the signal paths being referred to as secondary signals), at least one filter and/or delay element in at least one of the signal paths, weighting circuitry that performs a weighting function on the secondary signals within the signal paths, summing circuitry that sums the secondary signals to provide a time correlated, weighted filter sum signal, and capturing circuitry that captures the secondary signals after the secondary signals have encountered any filter or delay element in the signal paths to produce a value of the time correlated, weighted filter sum signal, following capturing and summing, that is a measure of the integrated area $Q_{gT}$ of the input signal.

In accordance with the above-mentioned aspects, the filtering, delaying and/or capturing operations (filter and/or delay element and/or the capturing circuitry in the case of apparatus) establish a defined time correlation between the secondary signals with respect to one another prior to the secondary signals being summed, and. Further the weighting coefficients applied to the secondary signals are selected, based on the nature of any filters used in the filtering operations, on the defined time correlation established between the secondary signals, and on the values of the one or more decay time constants associated with the device, to compensate the measured area $Q_{gT}$ for the risetime structure of the step-like pulse, for the presence of more than one decay time constant, or for both.

In accordance with the above-mentioned aspects, the order of weighting, filtering, and delaying may vary. For example, weighting may occur prior to filtering or delaying, filtering may occur prior to delaying or weighting, or delaying may occur prior to filtering or weighting. The order can differ between different secondary paths. Further, capturing may occur before or after summing. In some implementations, the capturing includes capturing one or more of the secondary signals following any filtering or delaying operations in their associated signal paths so that the summing of the secondary signals is the summing of weighted captured values of the secondary signals propagating along their associated signal paths. In other implementations, the capture occurs after the secondary signals have been subjected to any weighting, filtering, and/or delaying, and after they have been summed.

In another aspect, the present invention contemplates processing the device's (e.g., preamplifier's) output signal using a set of one or more shaping filters. Where plural filters are used, they typically have different time constants. A set of samples of the outputs of this filter set is captured in such a manner that the multiple sample values bear prescribed time relationships to one other. We refer to this set of sample values as a correlated multiple output sample (or "cMOS" for short). The relationships among the individual sample values may be determined by the times of their capture, by delay elements inserted in the signal paths, or some combination of the two. Further, the different individual sample values can be obtained from associated different filters, or plural sample values can be obtained from the same filter, but captured at different times or with different delays. The term cMOS is intended to cover these multiple possibilities and is discussed further in § 5.1 below.

In a first set of implementations, the input pulse's integrated area is determined by capturing a cMOS in response to detecting a step-like signal (sometimes called an event). A weighted sum of the individual sample values in the cMOS (sometimes referred to as cMOS values) is then formed as a measure of the input pulse's integrated area (e.g., total charge). The weighting factors can be computed directly from information about the device's decay constants, the filter set, and the prescribed time intervals in the cMOS.

In a second set of implementations, the input pulse's integrated area is determined by forming a continuous weighted sum of the cMOS values and then capturing a single value of this composite signal as the desired measure of the input pulse's integrated area. In this context, the term "continuous" refers to digital and analog signals. The weighting factors are computed identically in both sets of implementations. The capturing operation in the second set of implementations can be either in response to detecting a step-like signal in the device's output (as in the first set of implementations) or in response to detecting a maximum in the composite signal itself. The signal paths, which, in the first set of implementations, contained filtering and/or delaying operations, may also contain weighting operations here. By allowing our concept of the signal paths leading to the summation point to include the processing of discrete (i.e. sampled) signal values, we see that the only conceptual difference between the first and second sets of implementations is whether the sampling occurs before or after the summation point. In this generalized view, the device signal is transformed into the desired area measure by passing through a set of secondary signal paths which contain filtering, delaying, weighting, capturing and summing operations, and wherein the sequence in which these operations is performed is flexible. In the first set of implementations, the sequence is filtering, delaying, capturing, weighting and summing, while in the second set the sequence is filtering, delaying, weighting, summing and capturing. Once this concept is understood, then clearly other sequences, such as delaying, filtering, weighting, capturing and summing or weighting, delaying, filtering, summing and capturing are equally possible.

The resultant composite filter may thus be described as being a time correlated, weighted filter sum-filter (TCWFS-filter), where the secondary paths produce a weighted, filtered set of correlated multiple output signals (also cMOS, since these signals in their sampled form are the cMOS defined above). Thus the TCWF nomenclature extends the cMOS nomenclature by explicitly noting the presence of the weighting and filtering operations in the secondary signal paths, along with the delaying operations that produce the time correlations. TCWFS-filtering, therefore, may either be carried out continuously, in real time, or contingently. In the continuous case (our second set of implementations) the weighting and summing operations operate continuously, just as the filtering and delaying operations do, and the desired sample is captured from the composite output signal. In contingent time correlated, weighted filter sum-filtering (our first set of implementations), only some operations, such as filtering, are carried out continuously—a set of secondary signal values is captured in response to the detection of an event and the remaining steps required to produce a time correlated, weighted filter sum-filter output value are carried out only on this captured set of values. Contingent operations typically include weighting and adding. However, delaying may also be carried out implicitly by adjusting the samples' capture times. Either the continuous or contingent approach produces a single final value representing the input pulse's integrated area. Which approach is implemented depends upon the application. In general the continuous approach produces higher throughput, while the contingent approach uses lower cost components and is more flexible.

The TCWFS-filter sum of the cMOS set is the composite signal that contains at least some signal values that are proportional to the pulse's integrated area (or the energy of the event that generated it), provided that the weights are properly valued in relation to the filter functions, the delays, and the time constants in the device. These signal values will be local maxima in the time correlated, weighted filter sum-filter signal and may be captured by peak sensing techniques. They also occur a fixed time interval after the arrival of the step-like pulse in the primary signal and so may also be captured by timing methods. We show how the filter time constants and other elements of the method may be adjusted to increase the duration of the period during which the composite output signal is proportional to the pulse's integrated area, thereby relaxing the timing constraints required in the time capture method. Increasing the duration also increases the range of input pulse risetimes that can be accommodated.

For reasons of engineering efficiency, components may be shared when generating the secondary signal set. Thus, for example, the same filter, but with different delays may be used to generate two members of the set. In digitally implemented systems, a decimating step may precede filtering in order to reduce the resources required. In this case, the same decimator may precede several filters.

Particularly in the contingent approach, the term time correlated, weighted filter sum is intended to cover the multiple possibilities by which appropriate time correlations may be established between the members of the captured sample set and is discussed further in § 5.1 below. The individual sample values captured from the time correlated, weighted filter set secondary signals may sometimes be referred to as the time correlated, weighted filter set values. The time relationships among the individual time correlated, weighted filter set sample values may be determined by the response times of their filters (implicit delays), by delay elements inserted in the signal paths (explicit delays), the times of their capture, or some combination thereof. Further, the different individual sample values can be obtained from associated different filters, or plural sample values can be obtained from the same filter, but captured at different times or with different delays.

It is important to note that filtering, delaying, and weighting are independent operations in TCWFS-filtering, and can be carried out in any order. As a first example, it is this flexibility that make it easy to implement contingent TCWFS-filtering in which cMOS values are captured in response to a pulse and sent to a digital signal processor for the weighting and summing operations. Thus, while in continuous TCWFS-filtering the delayed filter outputs are weighted and summed prior to the capturing step (so that the captured value is immediately an estimate of the input pulse's integrated area), in the contingent case the capturing of each individual secondary signal can be carried out independently of the others. Thus time of capture can used to introduce the proper delay for one filter's output while another may have a hardwired delay built in. As a second example, in certain systems, particularly with analog implementations, it can be effective to carry out weighting (i.e. gain adjustments) and/or delaying prior to filtering. Third, because filters incorporate implicit time delays, it is also possible to design time correlated, weighted filter sum-filters that do not require explicit time delays to achieve the time correlations upon which the method depends.

For the invention method to work accurately, the used weighting factors are chosen to properly reflect the M-P device's decay constants, the response functions of the filters, and the time correlations between the different time correlated, weighted filter set signals. We show how the weighting factors can be computed mathematically, using an analytical description of the step-like output pulse shape and the filter time response functions.

While specific embodiments of the invention use triangular, trapezoidal and running average filters, the invention does not require specific filter shapes. Further, the invention does not require that the filter's capture times be precisely located relative to the step-like signal's leading edge. Rather, the method derives its accuracy from repeatably reproducing the set of prescribed time relationships between the sample values in the cMOS. The underlying capture method is therefore time-based rather than amplitude-based, which differentiates the invention from prior art methods which capture filter samples based on their maximum amplitudes.

While the preferred implementation uses digital signal processing, implementations using solely analog processing or hybrid approaches are also feasible. Embodiments of the invention require neither a measurement of the step-like signal's risetime nor more precise information about its arrival time than is found by the pileup inspection circuits of commonly available commercial shaping amplifiers.

When using TCWFS-filtering, however, measurement noise is increased by the number N of additional filter samples required to compensate for the N-1P device's multiple terms. For those cases where this increased noise is significant, we also show how N may be reduced by creating a parameterized model of the non-ideal terms; making baseline measurements to determine the parameters; and then using them to correct area (e.g., charge) measurements made using simpler sets of filters which have less noise. In some implementations, these baseline measurements are TCWFS-filter values captured at times when the filters are not processing the step-like signals. In the detector-preamplifier case described in detail, the resultant implementation achieves the low electronic noise levels of conventional trapezoidal filters while also eliminating resolution loss due to both ballistic deficit and high count rates.

A further understanding of the nature and advantages of the present invention may be realized by reference to the remaining portions of the specification and the drawings.

DESCRIPTION OF SPECIFIC EMBODIMENTS

1. Introduction

Figure 1A:
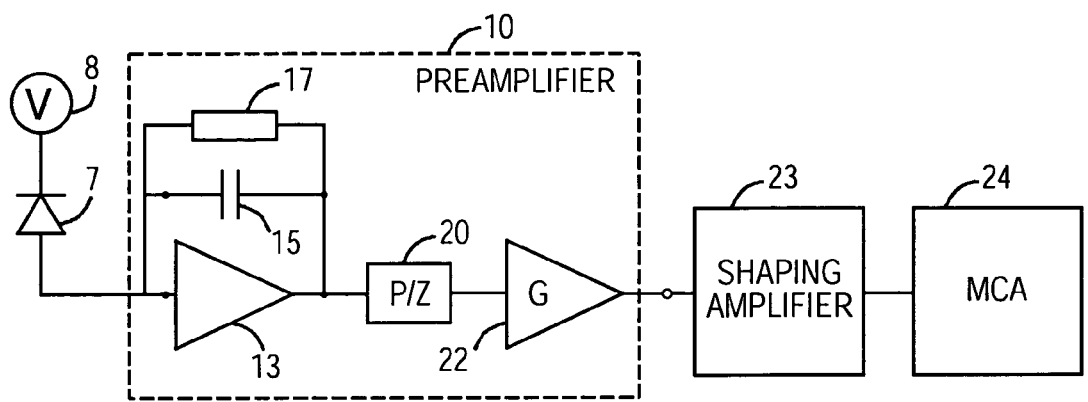
FIG. 1A shows a schematic of a semiconductor γ-ray detector front end, including a resistive feedback integrator, pole/zero network and output gain stage.
Figure 1B:
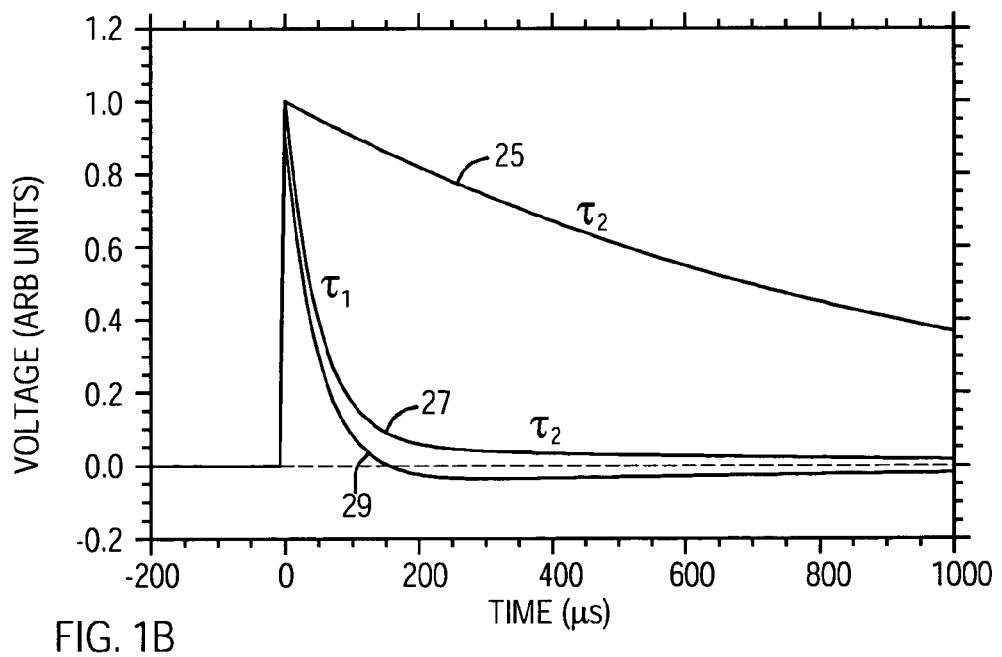
FIG. 1B shows voltages generated by the preamplifier portion of the circuit in FIG. 1A when the pole/zero circuit is not ideally adjusted.
Figure 2:
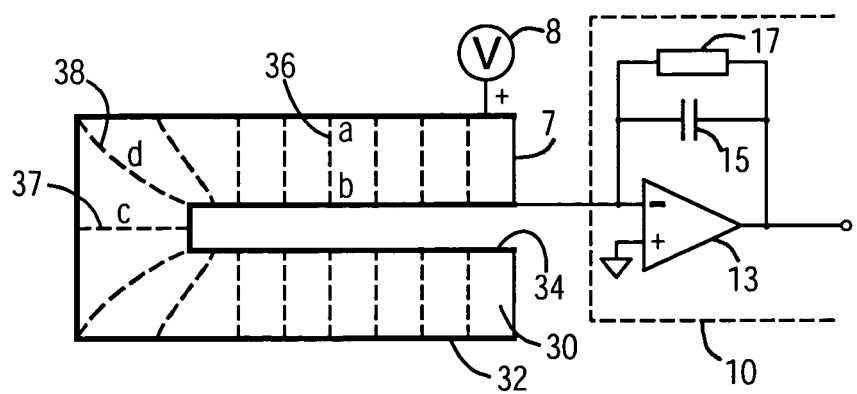
FIG. 2 expands the detector structure of FIG. 1A to demonstrate the geometric and other factors which contribute to signal risetime variations.
Figure 3A:
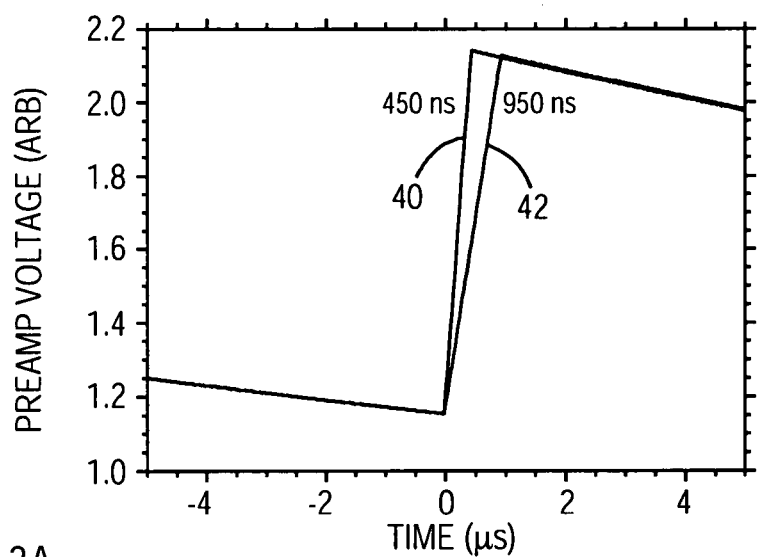
FIG. 3A shows the variation in risetime between pure electron and pure hole collection for a simple collection path in the detector structure of FIG. 2.
Figure 3B:
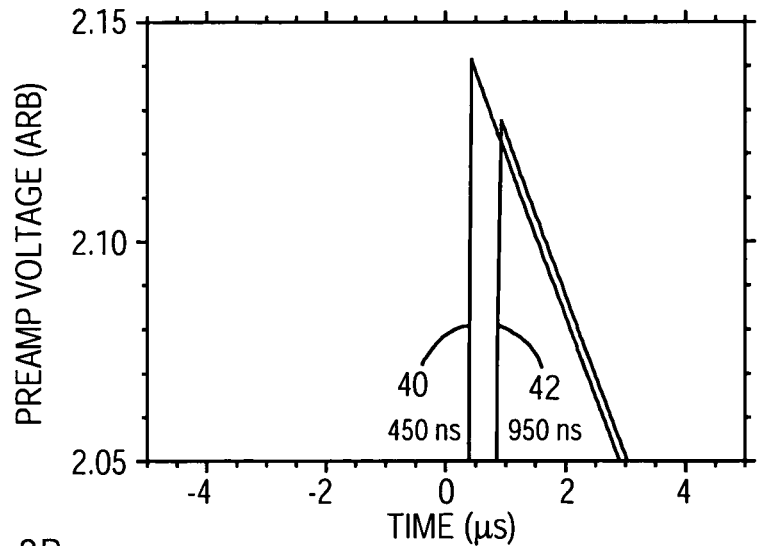
FIG. 3B shows an expanded view of the signal peaks in FIG. 3A.

Applied to preamplifiers that produce step-like output pulses in response to detector energy absorption events, the invention time correlated, weighted filter sum-filtering (TCWFS-filter) technique includes the following three basic steps: 1) generating, by applying different sets of filtering, delaying, and weighting operations to the preamplifier output, a set of time correlated, weighted, filtered secondary signals, or correlated multiple output signals (cMOS); 2) summing the secondary cMOS signals to produce a time correlated, weighted filter sum output signal; and, 3) capturing a value of the time correlated, weighted filter sum-filter output from which the energy of the detected event can be accurately recovered. The accuracy of the method relies upon selecting the applied weights to properly reflect the filters' transfer functions, the values of the time delays, and the values of the one or more decay times in the preamplifier's output response.

Since only a single value of the TCWFS-filter output is used in the energy recovery step, the method can be designed to operate either continuously or contingently, in response to a detected step-like pulse. In the contingent approach, at least the filtering is carried out continuously and a set of values of the cMOS secondary signals is captured in response to detecting a step-like pulse. The remaining steps to generate the TCWFS-filter output value are then carried out only on this set of captured values. The individual members in the captured set need not be captured simultaneously and, in particular, adjusting their capture times is explicitly presented as a means of contingently implementing necessary delays. In the continuous approach, the cMOS signals include weighting and are summed continuously, with a value of the summed TCWFS-filter signal then being captured to recover the area of the input pulse.

The method is based upon an understanding of filters as producing a convolution of a filter weighting function with an input signal, so that, at any instant, the filter's output contains time correlated information about the signal over some past period. By capturing filter outputs at particular times (or, with delays, at the same time), we can thus capture information about different time intervals of the signal and then combine them to recover some characteristic of the signal, such as its integrated area. The appropriate time correlations in the TCWFS-filter method are thus achieved by adjusting the filters' response functions, inserting delays into the signal paths, setting the times of capture, or a combination thereof, and are independent of the specific risetime shape of any particular event.

Our overall goal, therefore, is to describe how to select an appropriate set of filters; how to define the appropriate time delays between the cMOS filter set signals; and show how to compute the required weighting functions. Our description will move from the specific to the general. We will start by creating an analytic model of an isolated step-like pulse and describe how to manipulate summations of data values in the pulse to obtain the integrated area of the input pulse that produced it. From this static case we will move naturally to contingent time correlated, weighted filter sum-filtering, wherein we use a mixture of timing and delays to capture these same summations from step-like pulses in real time and then perform the same manipulations (e.g. weighting and summing) offline to recover the associated areas. Finally, in the last step of the development, we make the weighting and summing operations continuous in order to achieve a real time TCWFS-filter.

The theory underlying the invention technique is based on modeling the device's (e.g., preamplifier's) step-like output response (the "output") to the input charge (or impulse: the "input") generated by the event as the sum of a small number of analytical functions which are represented by the same number of amplitudes. In a specific embodiment, five amplitudes are used to describe: the $\tau_1$ and $\tau_2$ exponential components prior to the step-like signal, the ideal amplitude of the step itself, an error term due to the ballistic deficit, and a DC level.

We first reduce the number of amplitudes to four by making differential filter measurements which are DC level insensitive. To find these four amplitudes, we make four independent measurements (from three filters) in the step's vicinity, express each measurement as a linear combination of the four amplitudes, and solve the resultant set of four linear equations to recover the ideal step amplitude, which is proportional to the input charge (or impulse area). Obtaining a set of equations which is well conditioned and insensitive to preamplifier noise, ballistic deficit, and $\tau_2$ amplitude is then primarily a matter of selecting an appropriate set of filters and time correlated capture points, which then define the cMOS.

We observe that, although we are considering the preamplifier to be a "nominally single-pole device," we do not actually made any assumptions about the magnitudes of the two decay terms or of the DC component in developing the analytic model of the step-like pulse. The developed technique is therefore general, and can be directly applied to any complex pulse shape, produced by a device with various numbers of poles and zeros, for which an analytic model can be developed.

Step amplitudes obtained using the four-filter measurement technique have almost a factor of 3 higher electronic noise than simple trapezoidal filters. In cases where this is important, we show how simpler filters can be corrected for the $\tau_2$ and DC components by developing a parameterized model of these terms and making one or more baseline measurements to determine their values. When multiple measurements are made, the parameters must be compensated for their evolution in time, creating a time-compensated model.

The description below is organized as follows In § 2, using a static, captured step-like signal, we locate several filters in the vicinity of its leading edge and mathematically describe their outputs in terms of the base amplitudes. In § 3, we use these results to set up and solve the set of linear equations to obtain the input charge. This solution has the form of a weighted sum of the filter values, showing the genesis of the weighting coefficients. In § 4, we evaluate the technique for two filter sets which compensate simultaneously for inexact pole/zero cancellation and ballistic deficit. In § 5, we introduce the concept of the cMOS to show how to implement the invention contingent TCWFS-filtering in real time processing situations. In § 6, we will describe various circuits which implement this technique: a purely digital pair, a purely analog circuit and a hybrid analog-digital circuit. In § 7, we analyze our technique's electronic noise. In § 8, we show how a simpler, three filter TCWFS-filter measurement can be used to achieve similar accuracy with lower noise, provided time recorded baseline measurements are made to correct for the $\tau_2$ and DC preamplifier components In § 9 we show how continuous TCWFS-filtering can be implemented and show how it produces a superior flat-top filter output in the presence of multiple poles and charge collection time variations. Finally, in § 10 we show how a 5 term filter produces superior high count rate performance with CsI(T1) scintillators, which show 2-pole outputs.

Figure 4:
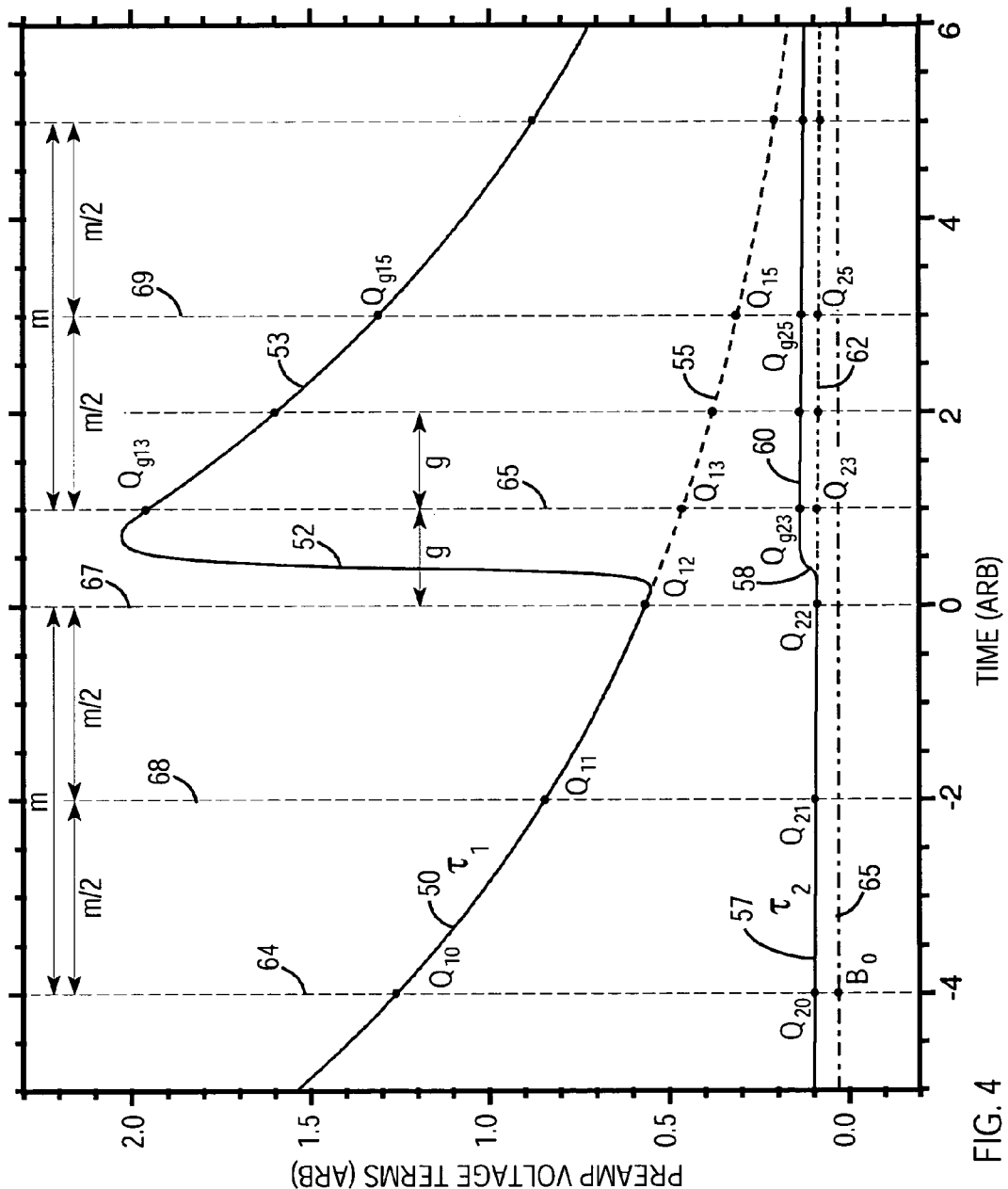
FIG. 4 shows a step-like feature in a general preamplifier output, broken into its component signals, and establishes a nomenclature system for describing these signals mathematically.

2. Mathematical Description of Generalized Filter Outputs 2.1. Decay Components of the Step-Like signal FIG. 4 shows a typical preamplifier step-like output signal as it might look if it were digitized by an analog to digital converter (ADC) and saved in a computer memory. The shown time scale is arbitrary, with zero set a little before the onset of charge collection for convenience. To simplify the image, only a few members of the set of discrete values have been identified explicitly: subscripted capital Q's denote values at specific instants since the signal really represents the charge integrated on feedback capacitor 15 by amplifier 13. The $\tau_1$ component has three regions: an exponential decay region 50 prior to the step (i.e., times less than 0), a charge collection region 52, and an exponential decay region 53 following the step (i.e., times greater than 1). The curve 55, showing how curve 50 would have continued to decay had the step not arrived, represents the continued time decay of all previous steps, that is, the preamplifier's first pole residual response to those previous steps. The signal's $\tau_2$ component has the equivalent four regions 57, 58, 60, and 62. Finally, there is the preamplifier's DC offset value $B_0$ 65, which is constant. The $\tau_1$ and $\tau_2$ charges injected by the γ-ray pulse decay independently, since the preamplifier is a linear device. The total collected charge $Q_{gT}$ generating this event thus divides into $Q_{1gT}=(1-\beta)Q_{gT}$ for $\tau_1$ and $Q_{2gT}=\beta Q_{gT}$ for $\tau_2$, $\beta$ being the division ratio.

It is important to note that, in the following, we will be describing a signal processing technique which relies on the mathematical form of the signals and not on their physical source. While we develop the technique in the context of preamplifier signals from γ-ray detector preamplifiers, the technique itself can be usefully applied to any signals which have the appropriate form. Similar outputs would generally be obtained from other nominally single pole devices (N-1P devices) in response to impulse inputs of extended duration and variable amplitude. In the present case these signals result from a single-pole electronic circuit with second-pole error terms responding to an input pulse from a detector, in other cases the detector itself may produce signals of the appropriate form. The temperature response of a superconducting bolometer, for example, shows this behavior [STAHLE-1999] and could be treated by the technique, as does the light output from CsI(T1) scintillator crystals [SKULSKI-2001].

2.2. Running-Sum Filter Output

If r values are sampled at uniform intervals $\Delta t$ from an exponential decay with time constant $\tau_j$, then the $i^{th}$ value $Q_{j,i}$ is given by:

$$Q_{j,i} = Q_{j,0}\exp(-i\Delta t/\tau_j) = Q_{j,0}b_j^i, \text{ for } (0 \leq i \leq r-1) \quad (1)$$

where $b_j = \exp(-\Delta t/\tau_j)$ is the decay per $\Delta t$. Therefore, a $k^{th}$ digital filter, whose response function is defined by weighting constants $\{w_{i,k}, 1 \leq i \leq r-1\}$, acting on the values in Eqn. 1 gives:

$$\sigma_{jk,r} = \sum_{i=0}^{r-1} Q_{i,j}w_{i,k} = Q_{j,0}\sum_{i=0}^{r-1} b_j^i w_{i,k} \equiv Q_{j,0}A_{jk,r}^*, \quad (2)$$

where the * marks this as a general filter result. This shows that the filter output is linear in the amplitude $Q_{j,0}$, multiplied by $A^*_{j,k,r}$, which is a constant for a particular filter and decay constant $\tau_j$. For a simple running-sum filter (see WARBURTON-1999), w equals unity, so $$A_{j,r} = \sum_{i=0}^{r-1} b_j^i = \frac{1-b_j^r}{1-b_j} \equiv r_j(1-b_j^r). \quad (3)$$

Eqn. 3 also defines the division factor $r_j$, which is equal to the sum to infinity. These are finite impulse response filters whose outputs are responsive to signal inputs up to r steps in the past.

2.3. General Trapezoidal Filter Output with Risetime in its Gap

Next, consider a running-sum $\sigma_{\Sigma+}$ of m samples starting at time 1 over the signal in FIG. 4. Decomposing the signal into 5 components with amplitudes $\{Q_{g13}, Q_{13}, Q_{g23}, Q_{23},$ and $B_0\}$, Eqns. 2 and 3 give:

$$\sigma_{\Sigma+} = Q_{g13}A_{1,m} + Q_{13}A_{1,m} + Q_{g23}A_{2,m} + Q_{23}A_{2,m} + mB_0, \quad (4)$$

where the index j in $A_{j,m}$ equals 1 or 2 for $\tau_1$ and $\tau_2$. The equivalent sum $\sigma_{\Sigma-}$, starting at time −4, which only sees amplitudes $\{Q_{13}, Q_{23},$ and $B_0\}$ is then:

$$\sigma_{\Sigma-} = Q_{10}A_{1,m} + Q_{20}A_{2,m} + mB_0. \quad (5)$$

The difference $(\sigma_{\Sigma+} - \sigma_{\Sigma-})$ is a trapezoidal filter $\sigma_\Sigma$ of risetime m and gap g. Since $Q_{10} = b_1^{-m-g}Q_{13}$ and $Q_{20} = b_2^{-m-g}Q_{23}$:

$$\sigma_\Sigma = \sigma_{\Sigma+} - \sigma_{\Sigma-} = Q_{g13}A_{1,m} + Q_{13}\alpha(1,m,-m-g) + Q_{g23}A_{2,m} + Q_{23}\alpha(2,m,-m-g), \quad (6)$$

where $\alpha(j,r,s) = A_{j,r}(1-b_j^s)$ and the DC components cancel. In Eqn. 6, we stress that $Q_{13}$ represents, at time instant 3, the preamplifier's dominant pole ($\tau_1$) response to all preceding step-like signal events; $Q_{23}$ similarly represents the secondary pole ($\tau_2$); while $Q_{g13}$ and $Q_{g23}$ are their amplitude responses to the present event. Eqn. 6 takes its simple form because the signal rise occurs entirely within the filter gap region g, so only decaying exponential terms are measured outside. Thus $\sigma_\Sigma$ is relatively insensitive to the precise location of the step within the gap region because its weighting constants are negligible (zero, in fact) there. At any time step, the output of this filter is responsive to signal values up to 2 m+g steps into the past.

2.4. Triangular Filter Over the Charge Collection Region

To explicitly probe the step's risetime region, we will use a triangular filter (gap=0) $\sigma_g = (\sigma_{g+} - \sigma_{g-})$ of risetime g, whose subtractive leg $\sigma_{g-}$ sits precisely within the gap of $\sigma_\Sigma$. (This relationship will also be easy to achieve when we implement a digital real time system.) We will show that the precise location of the step within the gap is not important. Then, as above:

$$\sigma_g = \sigma_{g+} - \sigma_{g-} \quad (7)$$
$$= Q_{g13}A_{1,g} + Q_{13}\alpha(1, g, -g) + Q_{g23}A_{2,g} +$$
$$Q_{23}\alpha(2, g, -g) - \sum_{i=0}^{g-1} q_{1g,i} - \sum_{i=0}^{g-1} q_{2g,i},$$

where the $q_{jg,i}$ are the sampled charge values at each interval in the subtracted running-sum region, each comprising the new charge increment collected in that interval plus the exponentially decaying remnants of the charges collected in the previous intervals.

Since each charge increment decays to zero independently, while their sum equals the total collected charge, we can write $$r_1 Q_{1gT} = \sum_{i=0}^{\infty} q_{1g,i} \quad \text{and} \tag{8a}$$

$$r_2 Q_{2gT} = \sum_{i=0}^{\infty} q_{2g,i}. \tag{8b}$$

Splitting the infinite summation in Eqn. 8a, however, also gives:

$$r_1 Q_{1gT} = r_1 Q_{gT}(1-\beta) = \sum_{i=0}^{g-1} q_{1g,i} + r_1 Q_{g/3}, \tag{9}$$

so that $$\sum_{i=0}^{g-1} q_{1g,i} = r_1 \{Q_{gT}(1-\beta) - Q_{g/3}\} \equiv r_1 Q_{c1}. \tag{10}$$

The correction charge $Q_{c1}$ defined in Eqn. 10 is the difference between the total $\tau_1$ collected charge and the amount remaining at the end of gap g. $Q_{c1}$ will typically be of order 2% of $Q_{gT}$. As a small correction term, $Q_{c1}$ will be relatively uncorrelated to $Q_{g13}$, so the set of linear equations we solve for $Q_{g13}$ and $Q_c$ be well conditioned under inversion.

Similarly, for the $\tau_2$ component in Eqn. 8b:

$$\sum_{i=0}^{g-1} q_{2g,i} = r_2 \{Q_{gT}\beta - Q_{g23}\} \equiv r_2 Q_{c2}, \tag{11}$$

where $Q_{c2}$ will be smaller than $Q_c$ by approximately the ratio $\tau_1/\tau_2$. Eqns. 10 and 11 allow us to express $\sigma_g$ entirely in terms of $Q_{gT}$, the total charge, and values from outside of the charge collection region, where the signals behave strictly as decaying exponentials. Equivalent integral expressions may similarly be derived in the continuous signal case or for filters with other weighting constants.

2.5. Eliminating $Q_{c2}$

When the gap region is much smaller than both $\tau_1$ and $\tau_2$, $Q_{c2}$ becomes proportional to $Q_c$ to a high degree of accuracy. This may be seen by defining $Q_{gi}$ as the total γ-ray charge collected at time interval i in the collection region. Since each $Q_{gi}$ decays independently, we can write for the two components:

$$\sum_{i=0}^{g-1} (1-\beta)Q_{gi} b_1^{g-i} = Q_{g/3} \quad \text{and} \tag{12a}$$

$$\sum_{i=0}^{g-1} \beta Q_{gi} b_2^{g-i} = Q_{g23}, \tag{12b}$$

while, by definition, $$\sum_{i=0}^{g-1} (1-\beta)Q_{gi} = (1-\beta)Q_{gT} \quad \text{and} \tag{13a}$$

$$\sum_{i=0}^{g-1} \beta Q_{gi} = \beta Q_{gT}. \tag{13b}$$

Thus, for $Q_c$:

$$Q_c = (1-\beta)Q_{gT} - Q_{g/3} = (1-\beta)\sum_{i=0}^{g-1} Q_{gi}(1-b_1^{g-i}). \tag{14}$$

Expanding $b_1^{g-i}$ to good accuracy as $(1-(g-i)\Delta t/\tau_1)$ gives $(1-b_1^{g-i})$ equal to $(g-i)\Delta t/\tau_1$ so:

$$Q_c = (1-\beta)\frac{\Delta t}{\tau_1}\sum_{i=0}^{g-1} Q_{gi}(g-i). \tag{15}$$

Similarly, $$Q_{c2} = \beta \frac{\Delta t}{\tau_2}\sum_{i=0}^{g-1} Q_{gi}(g-i), \tag{16}$$

where $\rho_2$ is equal to $\Delta t/\tau_2$. Comparing Eqns. 15 and 16:

$$Q_{c2} = \frac{\beta \tau_1}{(1-\beta)\tau_2} Q_c \equiv F Q_c. \tag{17}$$

$Q_{c2}$ is therefore quite small, being about 0.1% of $Q_c$ or 0.002% of $Q_{gT}$. We can therefore express any of our filters in terms of the four quantities $Q_{gT}$, $Q_c$, $Q_{g13}$ and $Q_{g23}$ using:

$$\sum_{i=0}^{g-1} q_{1g,i} = r_1 Q_c \tag{18a}$$

$$Q_{g13} = (1-\beta)Q_{gT} - Q_c \tag{18b}$$

$$\sum_{i=0}^{g-1} q_{2g,i} = r_2 F Q_c \tag{18c}$$

$$Q_{g23} = \beta Q_{gT} - F Q_c. \tag{18d}$$

3. Solving for Collected Charge $Q_gT$ from the Captured Waveform 3.1. Filter Expressions in Terms of the Base Amplitudes § 2.5 shows how all difference filters in the vicinity of the step's leading edge can be expressed as linear equations in the four amplitudes $Q_{gT}$, $Q_c$, $Q_{g13}$ and $Q_{g23}$ (non-difference filters will also require $B_0$). Therefore we must make four (or five) independent filter measurements to solve for $Q_{gT}$. While a wide variety of filters could be used, certain sets will be better conditioned than others and will also require less measurement precision to accommodate step risetime variations. Research and experimentation have shown the following set to function well: 1) the trapezoidal "energy" filter of risetime m from Eqn. 6; 2) the triangular "risetime probe" filter of Eqn. 7; and, 3) a pair of triangular "$\tau_1$ and $\tau_2$ background" filters of risetime m/2, situated at times −4 and +1 in FIG. 4, respectively. It is important to notice that, in this selection, only the risetime probe filter processes the step's risetime, which lies in the energy filter's gap and is entirely outside the range of the two other triangular filters. This placement, where only the risetime probe filter has non-negligible weighting constants in the risetime region, assures that their outputs, and hence $Q_{gT}$ estimate, will be insensitive to the precise location of the signal step within the gap, which, in real time implementations, will remove any need for great timing precision. Also, as we will show in § 9, the gap length must exceed the longest risetime that the filter will be expected to process correctly That the filters share some common starting and stopping points is primarily a matter of mathematical and implementational convenience, but is not fundamental to the technique.

Substituting Eqns. 18 into Eqns. 4 through 7 gives four linear equations for $\sigma_{\Sigma+}$, $\sigma_{\Sigma-}$, $\sigma_\Sigma$ and $\sigma_g$ in terms of $Q_{gT}$, the total new charge, $Q_c$, the correction charge, $Q_{13}$, the residual $\tau_1$ charge at time 3, and $Q_{23}$, the residual $\tau_2$ charge at time 3:

$$\sigma_{\Sigma+} = Q_{gT}[(1-\beta)A_{1,m} + \beta A_{2,m}] - Q_c[A_{1,m} + FA_{2,m}] + Q_{13}[A_{1,m}] + Q_{23}[A_{2,m}] + mB_0, \quad (19a)$$

$$\sigma_{\Sigma-} = Q_{gT}[0] - Q_c[0] + Q_{13}[b_1^{-m-g}A_{1,m}] + Q_{23}[b_2^{-m-g}A_{2,m}] + mB_0, \quad (19b)$$

$$\sigma_\Sigma = Q_{gT}[(1-\beta)A_{1,m} + \beta A_{2,m}] - Q_c[A_{1,m} + FA_{2,m}] + Q_{13}[\alpha(1,m,-m-g)] + Q_{23}[\alpha(2,m,-m-g)], \quad (19c)$$

$$\frac{\sigma_g}{r_1} = Q_{gT}\left[\frac{(1-\beta)A_{1,g} + \beta A_{2,g}}{r_1}\right] - Q_c\left[(2-b_1^g) + \frac{r_2}{r_1}F(2-b_2^g)\right] + Q_{13}\left[\frac{\alpha(1,g,-g)}{r_1}\right] + Q_{23}\left[\frac{\alpha(2,g,-g)}{r_1}\right]; \quad (19d)$$

We divided $\sigma_g$ by $r_1$ so that the coefficient of $Q_c$ will approximately equal unity for inversion stability.

Using the same methods for the outputs of three filters of length m/2 (two triangular filters $\sigma_{43}$ and $\sigma_{21}$ whose running-sum first points are: $\sigma_{43}$=[time+3: time+1] and $\sigma_{21}$=[time −2: time −4] and a trapezoidal filter $\sigma_{32}$=[time+2: time −2]) gives:

$$\sigma_{43} = -Q_{gT}\left[(1-\beta)\alpha\left(1,\frac{m}{2},\frac{m}{2}\right) + \beta\alpha\left(2,\frac{m}{2},\frac{m}{2}\right)\right] + Q_c\left[\alpha\left(1,\frac{m}{2},\frac{m}{2}\right) + F\alpha\left(2,\frac{m}{2},\frac{m}{2}\right)\right] - Q_{13}\left[\alpha\left(1,\frac{m}{2},\frac{m}{2}\right)\right] - Q_{23}\left[\alpha\left(2,\frac{m}{2},\frac{m}{2}\right)\right], \quad (20a)$$

$$\sigma_{21} = -Q_{13}\left[b_1^{-m-g}\alpha\left(1,\frac{m}{2},\frac{m}{2}\right)\right] - Q_{23}\left[b_2^{-m-g}\alpha\left(2,\frac{m}{2},\frac{m}{2}\right)\right], \quad (20b)$$

$$\sigma_{32} = Q_{gT}[(1-\beta)A_{1,m/2} + \beta A_{2,m/2}] - Q_c[A_{1,m/2} + FA_{2,m/2}] + Q_{13}\left[\alpha\left(1,\frac{m}{2},-\frac{m}{2}-g\right)\right] + Q_{23}\left[\alpha\left(2,\frac{m}{2},-\frac{m}{2}-g\right)\right]. \quad (20c)$$

These filters also exclude the step's rising edge for location insensitivity. While this is not a requirement of our invention, it significantly simplifies both the coefficient derivations and trigger system timing requirements.

3.2. The Four-Filter Solution for $Q_{gT}$

Collecting results for the four filters listed at the start of § 3.1, we have:

$$\tau_\Sigma = Q_{gT}[(1-\beta)A_{1,m} + \beta A_{2,m}] - Q_c[A_{1,m} + FA_{2,m}] + Q_{13}[\alpha(1,m,-m-g)] + Q_{23}[\alpha(2,m,-m-g)] \quad (21a)$$

$$\frac{\sigma_g}{r_1} = Q_{gT}\left[\frac{(1-\beta)A_{1,g} + \beta A_{2,g}}{r_1}\right] - Q_c\left[(2-b_1^g) + \frac{Fr_2}{r_1}(2-b_2^g)\right] + Q_{13}\left[\frac{\alpha(1,g,-g)}{r_1}\right] + Q_{23}\left[\frac{\alpha(2,g,-g)}{r_1}\right], \quad (21b)$$

$$\sigma_{43} = -Q_{gT}\left[(1-\beta)\alpha\left(1,\frac{m}{2},\frac{m}{2}\right) + \beta\alpha\left(2,\frac{m}{2},\frac{m}{2}\right)\right] + Q_c\left[\alpha\left(1,\frac{m}{2},\frac{m}{2}\right) + F\alpha\left(2,\frac{m}{2},\frac{m}{2}\right)\right] - Q_{13}\left[\alpha\left(1,\frac{m}{2},\frac{m}{2}\right)\right] - Q_{23}\left[\alpha\left(2,\frac{m}{2},\frac{m}{2}\right)\right], \quad (21c)$$

$$\sigma_{21} = -Q_{13}\left[b_1^{-m-g}\alpha\left(1,\frac{m}{2},\frac{m}{2}\right)\right] - Q_{23}\left[b_2^{-m-g}\alpha\left(2,\frac{m}{2},\frac{m}{2}\right)\right], \quad (21d)$$

as four linear equations in four unknowns. The unknown parameters are of three types: 1) (type $P_1$) the unknown charge $Q_{gT}$ (the area of the input impulse in the general case); 2) (type $P_2$) charges describing the step's finite arrival time ($Q_c$) and the residual charges in the $\tau_1$ and $\tau_2$ decay modes ($Q_{13}$ and $Q_{23}$) from previous events; and 3) (type $P_3$) a set of fixed parameters $\{\tau_1, \tau_2, \beta, m$ and $g\}$ which describe the preamplifier's (or other device's) transfer function and the applied filters. Since the coefficients in [ ]'s are functions only of the type $P_3$ parameters, they are constants which need be computed only once for a given preamplifier and filter set.

Eqns. 21 can be solved by several methods, including casting them into matrix notation and then inverting the coefficient matrix. Thus:

$$\begin{bmatrix} \sigma_\Sigma \\ \dfrac{\sigma_g}{r_1} \\ \sigma_{43} \\ \sigma_{21} \end{bmatrix} = \tag{22}$$

$$\begin{bmatrix} (1-\beta)A_{1,m} + \beta A_{2,m} & -A_{1,m} - FA_{2,m} & \alpha(1, m, -m-g) & \alpha(2, m, -m-g) \\ \dfrac{(1-\beta)A_{1,g} + \beta A_{2,g}}{r_1} & -(2-b_1^g) - \dfrac{Fr_2}{r_1}(2-b_2^g) & \dfrac{\alpha(1, g, -g)}{r_1} & \dfrac{\alpha(2, g, -g)}{r_1} \\ -1(1-\beta)\alpha\left(1, \dfrac{m}{2}, \dfrac{m}{2}\right) - \beta\alpha\left(2, \dfrac{m}{2}, \dfrac{m}{2}\right) & \alpha\left(1, \dfrac{m}{2}, \dfrac{m}{2}\right) + F\alpha\left(2, \dfrac{m}{2}, \dfrac{m}{2}\right) & -\alpha\left(1, \dfrac{m}{2}, \dfrac{m}{2}\right) & -\alpha\left(2, \dfrac{m}{2}, \dfrac{m}{2}\right) \\ 0 & 0 & -b_1^{-m-g}\alpha\left(1, \dfrac{m}{2}, \dfrac{m}{2}\right) & -b_2^{-m-g}\alpha\left(2, \dfrac{m}{2}, \dfrac{m}{2}\right) \end{bmatrix} \begin{bmatrix} Q_{gT} \\ Q_c \\ Q_{13} \\ Q_{23} \end{bmatrix}$$

becomes $\sigma = J \cdot Q$, (23a)

so that $Q = J^{-1} \cdot \sigma$, (23b)

and $Q_{gT} = J_{11}^{-1}\sigma_\Sigma + J_{12}^{-1}\dfrac{\sigma_g}{r_1} + J_{13}^{-1}\sigma_{43} + J_{14}^{-1}\sigma_{21}$, (23c)

As a solution for $Q_{gT}$, Eqn. 23c has the advertised form: a weighted sum of the four filter outputs. The weighting coefficients $J_{ij}^{-1}$ are computed only once for a particular set of filters and $P_3$ parameters $\{\tau_1, \tau_2, \beta, m \text{ and } g\}$ and then multiplied by the four filter outputs $\sigma_\Sigma$, $\sigma_g/r_1$, $\sigma_{43}$ and $\sigma_{21}$ to obtain the total pulse charge $Q_{gT}$ (and hence the energy of the absorbed γ-ray) for each captured event. We note that if more filters are measured than there are parameters Q, the matrix can be inverted using least squares methods to obtain Eqn. 23b.

4. Evaluation for Two Filter Sets 4.1. A Four-Filter Set with Typical Parameters We now evaluate a typical case of the filter set leading to Eqns. 22 and 23: we let m equal to 4 μs, g to 1 μs and assume typical values of $\tau_1$=50 μs and $\tau_2$=1 ms with a division ratio β=0.04. In this case, for 40 MHz sampling, m=160, g=40 and we can compute $$J = \begin{bmatrix} 1.54041E+2 & -1.54138E+2 & -8.08795E+1 & -8.00411E+1 \\ 1.98087E-2 & -1.06150E+0 & -2.00007E-3 & -1.99953E-3 \\ -2.95906E+0 & 3.07604E+0 & -1.53785E+1 & -1.59682E+1 \\ 0.00000E+0 & 0.00000E+0 & -1.69959E+1 & -1.60483E+1 \end{bmatrix} \tag{24a}$$

$$J^{-1} = \begin{bmatrix} 6.309489E-3 & -9.623578E-1 & -1.593231E-2 & -1.549595E-2 \\ 1.190638E-4 & -9.600143E-1 & -2.284270E-4 & -2.469335E-4 \\ 1.194301E-2 & 6.874687E-2 & 6.221807E-1 & -6.786521E-1 \\ -1.264822E-2 & -7.280624E-2 & -6.589193E-1 & 6.564133E-1 \end{bmatrix}, \tag{24b}$$

and $Q_{gT}$=6.309486E-3$\sigma_\Sigma$-4.811789E-4$\sigma_g$1.593231E-2$\sigma_{43}$-1.549595E-2$\sigma_{21}$ (24c)

$\sigma_g$ is typically of order 0.25$\tau_\Sigma$, so the $\sigma_g$ term is typically less than 2% of $Q_{gT}$. In spite of its small size, however, $\sigma_g$ carries the burden of the ballistic deficit correction, since it is the only filter that probes the step's risetime directly.

The coefficients in Eqn. 24c also depend upon the value β. When the pole-zero is perfectly balanced, (β=0) Eqn. 24c becomes:

$Q_{gT}$=6.309486E-3$\sigma_\Sigma$-4.811789E4$\sigma_g$-1.593231E-2$\sigma_{43}$-1.549595E-2$\sigma_{21}$, (25)

where $\sigma_g$'s coefficient has changed by 4%, $\sigma_\Sigma$'s by 0.04%, and the $\sigma_{43}$'s and $\sigma_{21}$'s by about 0.008%. The need for β accuracy is therefore a function of how accurately one wishes to correct for risetime fluctuations and pole-zero inaccuracies. The $J^{-1}$ weighting coefficients are found to vary linearly with β, which allows β to be determined experimentally if it is not precisely known. To do this, first select a set of β values bracketing its expected value and compute Eqns. 24 to produce a set of weights $$\{J_{1n}^{-1}(\beta)\}$$

(the coefficients in Eqn. 24C) for each β value. Next collect data for each weight set $$\{J_{1n}^{-1}(\beta)\}$$

and measure the standard deviation $\sigma Q_{gT}(\beta)$ in $Q_{gT}$ (i.e., the energy resolution) which is obtained. Then, by plotting or interpolating the $\sigma Q_{gT}(\beta)$ results versus β, select a β value which minimizes $\sigma Q_{gT}(\beta)$. If the preamplifier is stable, β should only need to be determined once.

We tested the accuracy of Eqn. 24c in the presence of both risetime variations and a sizable $\tau_2$ decay term (equal to the $\tau_1$ step amplitude) using a spreadsheet to compute the filter responses for modeled waveforms. Table 1 presents these results. As may be seen, the Eqn. 24c is insensitive to both risetime fluctuations and $\sigma_2$ components at the few ppm level and is three orders of magnitude better than a simple trapezoidal filter.

TABLE 1

Modeled charge $Q_{gT}$ for 5 filters in the presence of varying risetimes and $\tau_2$ amplitudes for the case of β equals 0.02.

| | Risetime = 450 ns | | Risetime = 950 ns | |
|---|---|---|---|---|
| Model | $<\tau_2> = 0$ | $<\tau_2> = 1$ | $<\tau_2> = 0$ | $<\tau_2> = 1$ |
| Triangular | 0.861966 | 0.859787 | 0.831149 | 0.827170 |
| | (100.00%) | (99.75%) | (96.43%) | (95.96%) |
| Trapezoidal | 0.867397 | 0.862421 | 0.863901 | 0.858928 |
| | (100.00%) | (99.43%) | (99.59%) | (99.02%) |
| Section 4.1 | 0.999997 | 0.999997 | 1.000001 | 1.000001 |
| (Eqn. 24c) | (100.000%) | (100.000%) | (100.000%) | (100.000%) |
| Section 4.2 | 1.000119 | 1.000113 | 1.000028 | 1.000022 |
| (Eqn. 33) | (100.000%) | (99.999%) | (99.991%) | (99.990%) |

4.2. A Three-Filter Simplification Which Still has Good Performance

For cases which do not demand the precision of Eqn. 24c, or have small $\tau_2$ components, we show a simpler, three-filter set which still has good performance. We use trapezoidal/triangular filters for their insensitivity to the "DC-like" slow variation in the $\tau_2$ component: namely the same "energy" and "risetime probe" filters as in § 4.1 and a second trapezoidal filter $\sigma_{32}$ (Eqn. 20c), aligned to exclude the risetime region, to estimate $Q_{13}$. Thus, assuming β and $Q_{23}$ are all zero:

$$\begin{bmatrix} -\sigma_\Sigma \\ \frac{\sigma_g}{r_1} \\ W\sigma_{32} \end{bmatrix} = \begin{bmatrix} -A_{1,m} & A_{1,m} & -\alpha(1,m,-m-g) \\ 0 & 1 & b_1^{-g}\frac{\alpha(1,g,-g)}{r_1} \\ WA_{1,\frac{m}{2}} & -WA_{1,\frac{m}{2}} & W\alpha\left(1,\frac{m}{2},\frac{-m}{2}-g\right) \end{bmatrix} \begin{bmatrix} Q_{gT} \\ Q_c \\ Q_{13} \end{bmatrix}. \quad (26)$$

In Eqn. 26 we reversed the sign of $\sigma_\Sigma$ in order to create a filter that is differential on both sides of the step's rising edge and we weighted $\sigma_{32}$ by W to determine the value that gives the best results. We find the lowest noise is for W=1, so we can repeat Eqns. 24a and 24b to obtain:

$$Q_{gT} = 9.338925E\text{-}3\sigma_\Sigma\text{-}5.000000E\text{-}4\sigma_g + 3.106015E\text{-}2\sigma_{32}. \quad (27)$$

Table 1 shows that this result is sensitive to the $\tau_2$ component at the few ppm level and to risetime variations at the 100 ppm level. For many practical cases, this is sufficiently accurate. Assuming a random distribution of risetimes, for example, this would add less than 100 eV in quadrature to the energy resolution at 1 MeV, which would be scarcely perceptible.

5. Correlated Multiple Output Sampling (cMOS) in Contingent TCWFS-Filtering 5.1. Defining "Correlated Multiple Output Signals—cMOS"

The filter weighting Eqns. 25 and 27 derivations were developed as if the signals had been captured into memory, so the running-sums could simply be taken over the desired sample values. This implementation is feasible at lower data rates, but in a preferred implementation, as taught by WARBURTON-1997, a gate array is used to realize the difference of running-sum filters, which run in real time, each outputting a new value a fixed number of clock cycles after a new ADC sample is supplied. In general, then, there may be no single instant when a set of filter signal values can be captured which will reproduce the inter-filter time relationships required by Eqns. 25 and 27. Therefore, the outputs of the different filters will either have to be captured at different times, and these times will have to be carefully correlated if Eqns. 25 and 27 are to produce accurate values of $Q_{gT}$, or appropriate delays will have to be applied so that all the values can be captured simultaneously. Because multiple filter signal values must be captured, and their times of capture must be properly time correlated, we call the resultant set of captured values a "correlated multiple output sample set," or "cMOS," and refer to these values as "cMOS values." Since the cMOS values are a snapshot of the delayed filter output signals (the secondary signals) we will also refer to these "correlated multiple output signals" as the "cMOS" as well. Applying the weights of Eqns. 25 and 27, we obtain a set of "time correlated, weighted filter" values.

We also observe that the number of cMOS values required by Eqns. 25 and 27 and number of realized filters needed to produce them need not be the same. For example, in Eqn. 25, the $\sigma_{21}$ and $\sigma_{43}$ filter values both come from triangular filters of length m/2 with their starting points separated by the interval m+g. Thus two outputs from the same realized filter can be captured to supply the two required values.

While we have noted that the filter ranges do not have to be precisely positioned relative to the step's rising edge, the accuracy of their positions in time relative to one other in the cMOS capture determines the accuracy that the technique can attain. This is because the running-sum ranges, which translate directly into filter lengths and time intervals between starting locations, are encoded into the $J^{-1}$ weighting coefficients through terms like $\alpha(j,r,s)=A_{j,r}(1-b_j^S)$ (see, e.g., Eqn. 6), where r is the filter length and s the interval between the sum start points. For simplicity, we aligned the various filters so their starting points coincided, but other cases are trivially treated by scaling Eqns. 4–7 by terms like $b_i^t$, where t is the offset between starting locations. Therefore, there is an intimate relationship between the weighting coefficients and the filter ranges which, if violated, will introduce inaccuracies. The $J^{-1}$'s are computed for a particular set of filter sum ranges. If another set of ranges is captured, then expected cancellations between filter terms will not occur exactly and the differences will appear as errors in the detected charge. In digital implementations, the fact that the signal samples are discrete and enumerated makes is relatively easy to maintain accurate time relationships by measuring time in "ticks" of the digitization clock and then simply counting out the required time intervals.

The requirement of appropriate time correlations between the cMOS values clearly differentiates the present method from prior art as represented by the approaches of HINSHAW-1991 and KUMAZAWA-1988. While two filter outputs were captured and weighted in those methods, the capturing steps used peak detecting means. The methods are therefore amplitude based rather than time based, as in the present method, and the captured values carry different information about the step shapes. Further, the method of capturing based on peak detection assures that there will be no fixed time relationship between the captured samples since the two filters' times of maximum amplitude depend differently on step shape, which will vary from step to step.

In light of the above, it is clear that there will be a wide variety of possible approaches to capturing filter cMOS values to form the TCWFS-filter with the prescribed time relationships in response to detecting a pulse-like feature in the signal. The outputs of single filters can be captured multiple times. Filter outputs can be captured as they appear from the gate array or can be delayed for convenience. We will show several examples in § 6. Which method is best will depend upon implementation details and will vary from case to case. We therefore intend the phrases "cMOS" and "TCWFS-filter" to cover the multiplicity of possibilities for capturing, in a real-time implementation, filter values whose time relationships are correct for the set of $J^{-1}$ weighting coefficients that will be applied to them to recover the input charge from the detected event. When the capture is made in response to the detection of a step in the preamplifier's output signal, with the intention of using it to determine the charge deposited in the detector (in the general case the impulse area) and hence the gamma-ray's energy, we will often refer to it as an "energy (or "charge or area") cMOS or TCWFS capture" (as appropriate).

5.2. Timing Considerations

Filters, in real time implementations, require finite times to compute. For example, consider a trapezoidal filter of length (risetime) m and gap g over a set of values $\{q_i\}$, where $q_n$ is the last sample value ("end sample") to enter the filter:

$$\sigma_\Sigma(n) = \sum_{i=n-m}^{n} q_i - \sum_{i=n-2m-g}^{n-m-g} q_i. \tag{28}$$

If implemented in gate arrays according to the method of WARBURTON-1997, the output $\sigma_\Sigma(n)$ will appear 3 filter clock cycles after sample $q_n$ is presented. This is its propagation delay. For a 4 µs peaking time (filter clock equals 200 ns), the propagation delay is 600 ns. These delays must be included in the design to assure that the cMOS capture constraints are satisfied.

Figure 5A:
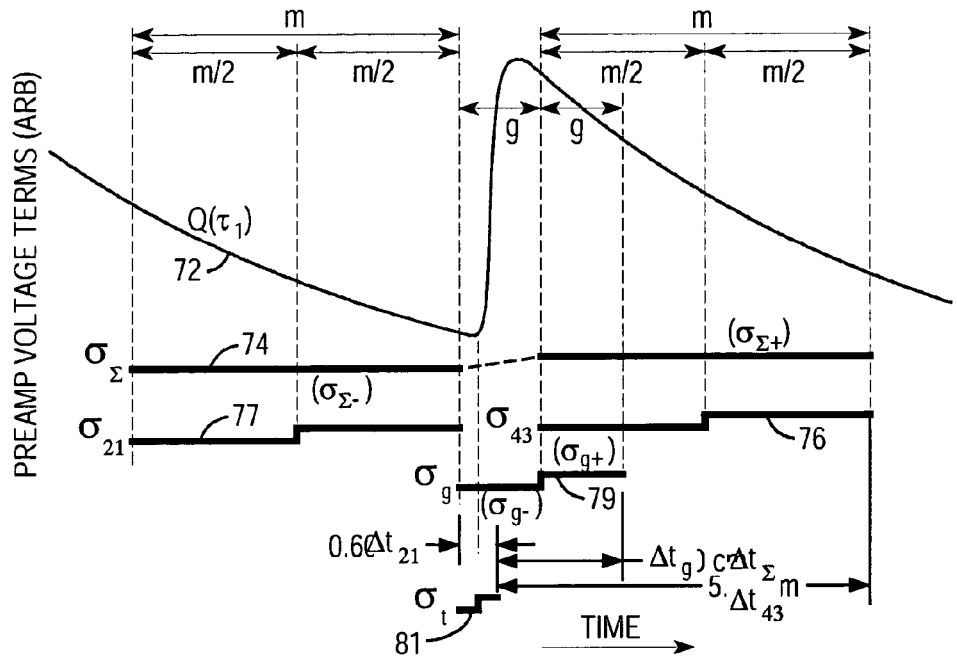
FIGS. 5A and 5B show how to compute the appropriate intervals between capture times of the multiple filters.
Figure 5B:
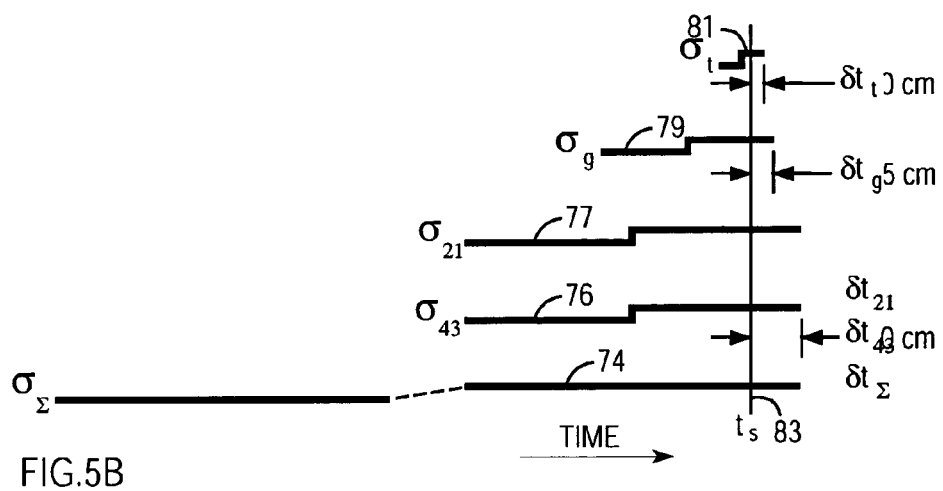

FIGS. 5A and 5B show how to compute sampling times for the Eqn. 24c filter set. The calculation has two steps: finding the time delays between their end samples of the different filters and then correcting for their different propagation delays. For the first step we use FIG. 5A, which shows the filter regions relative to the preamplifier output step 72. $\sigma_\Sigma$ 74, $\sigma_{43}$ 76, $\sigma_{21}$ 77, and $\sigma_g$ 79 were all described earlier. $\sigma_t$ 81 is a fast channel timing filter, as described by WARBURTON-1997, which is used to detect step-like signals in the preamplifier's output. The timing filter's output triggers a digital discriminator when it is located approximately as shown with respect to the leading edge of the signal step 72. We can now measure end sample delays relative to $\sigma_t$ 81 as shown, with the filters $\sigma_\Sigma$ 74, $\sigma_{43}$ 76, and $\sigma_g$ 79 appearing at times $\Delta t_\Sigma$, $\Delta t_{43}$, and $\Delta t_\Sigma$ after at $\sigma_t$ 81 and $\sigma_{21}$ 77 appearing $\Delta t_{21}$ earlier. From FIG. 5A, if $\sigma_t$ has a peaking time of T, then $\Delta t_\Sigma$ equals (m+g−2T).

It is important to note that, while the firing of $\sigma_t$ may jitter somewhat depending upon the step's risetime shape, this only causes the step location to jitter within the gap g. The relative timings of all the filters to $\sigma_t$, and thus to each other, are fixed by construction. Thus, provided $\sigma_g$ is wide enough to catch the step for any reasonable discriminator triggering, the filter will work as designed. This insensitivity to the timing accuracy with which the step-like signals are detected is a significant advantage of the present invention.

FIG. 5B shows the second step: correcting for propagation delays. We note that these delays may exceed a microsecond in long time constant filters and typically increase with filter length. FIG. 5B shows propagation delays with respect to the ADC sample time $t_s$ 83 for a 40 MHz implementation with g=1 µs and m=4 µs, so $\delta t_t$=75 ns, $\delta t_g = \delta t_{21} = \delta t_{43}$=300 ns, and $\delta t_\Sigma$=1,200 ns. Combining FIGS. 5A and 5B, we should sample the output of a given filter $\sigma_x$, at $$t_x = \Delta t_x + \delta t_x - \delta t_t \tag{29}$$

following the discriminator firing on $\sigma_t$'s output to assure the cMOS temporal relationships required to extract $Q_{gT}$ from the captured TCWFS values. If $t_x$ is positive, then a counter can be used to measure $t_x$ and capture the filter value. If $t_x$ is negative, however, then its propagation delay $\delta t_x$ will have to be increased by at least $|t_x|$ to meet the demands of causality (capturing must follow step detection in time). In digital implementations this is a simple operation using a FIFO memory. In our present example, no additional delay is required since a typical timing filter peaking time is 100 ns, so $\Delta t_{21}$=−200 ns and $$t_{21} = \Delta t_{21} + \delta t_{21} + \Delta t_t = -200 + 300 - 75 = 25 \text{ ns}, \tag{30}$$

which is positive.

6. Circuits Implementing the cMOS Contingent TCWFS-Filtering Method

6.1. Fully Digital Filter Implementations

Two general approaches are possible for capturing the cMOS values following (i.e., contingent upon) step detection: 1) asynchronously capturing values as they appear from the sub-filters, per the discussion of Sect. 5.2, and 2) extending the filters' propagation delays so that they can be synchronously captured. In the latter case all pileup inspection is carried out before the capture signal is given, while in the former case the values are captured as they appear and the pileup inspection is used to decide whether anything should be done with them afterwards. We will demonstrate one implementation of each to show the principles.

6.1.1. Asynchronous Capture Implementation

Figure 6A:
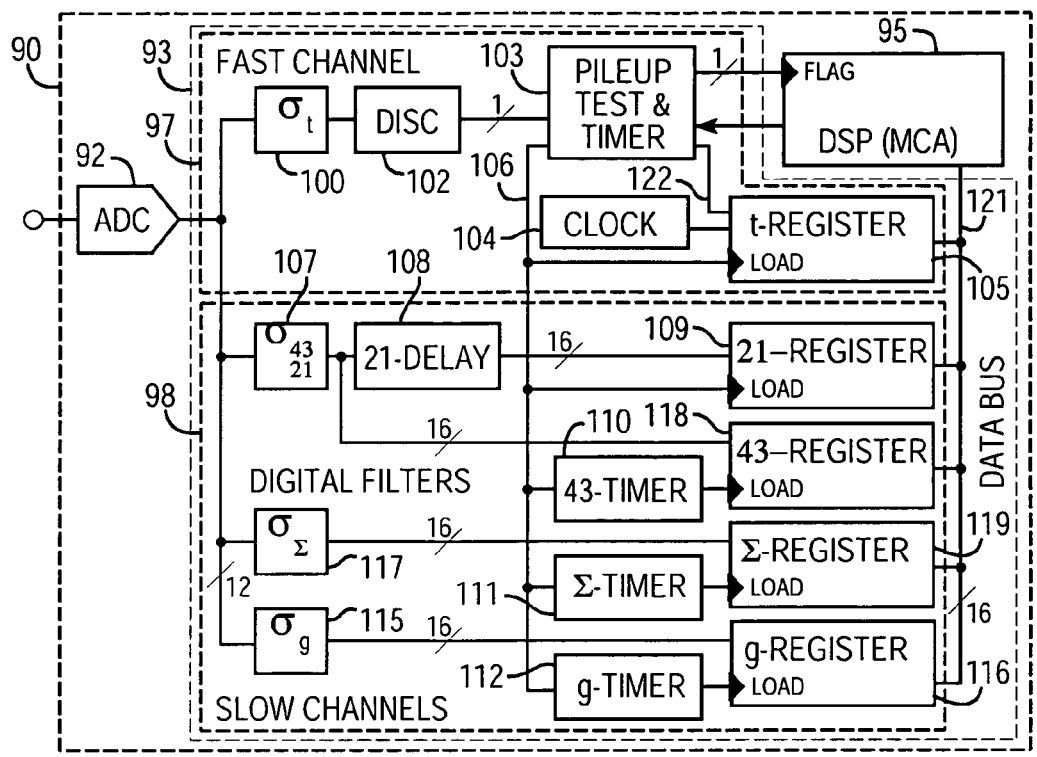
FIGS. 6A and 6B show a pair of purely digital circuits which implement the described technique.

FIG. 6A shows a preferred implementation of Eqn. 24c. The digital processor 90 comprises an ADC 92, a real-time digital processing unit (RT-DPU) 93, and a digital signal processor (DSP) 95. Per the method taught by WARBURTON-1997, the RT-DPU is implemented in combinatorial logic (e.g., a gate array) and processes data at the ADC output rate while the DSP processes data at the event rate (impulse signal rate). The RT-DPU produces values $\sigma_\Sigma$, $\sigma_{43}$, $\sigma_{21}$, and $\sigma_g$, while the DSP multiplies them by the coefficients $J^{-1}$ to obtain $Q_{gT}$.

The RT-DPU 93 also has two parts, a fast channel 97 and a number of slow channels 98. The fast channel contains the fast timing filter $\sigma_t$ 100, a digital discriminator 102, some pileup test and timer logic 103, a clock 104, and an output register 105. Each slow channel comprises a triangular or trapezoidal digital filter and an output register with either a digital delay line (if Eqn. 29 is negative) or a timer (if Eqn. 29 is positive). Notice that $\sigma_{43}$ and $\sigma_{21}$, both being of length m/2, are being implemented using a single triangular filter $\sigma_{4321}$ 107.

In operation, $\sigma_t$ 100 processes ADC 92 data until a step-like signal arrives. Discriminator 102 detects this step and signals the pileup inspector 103, which strobes a trigger line 106 and initiates pileup inspection. If the step's arrival time is important, the output of clock 104 can be captured to output register 105 by the same strobe signal 106. Filter $\sigma_{4321}$'s 107 output, delayed by $t_{21}$ using 21-delay 108 if required by Eqn. 29 causality, is captured immediately in the 21-register 109 by this trigger strobe, which also starts the 43-timer 110, Σ-timer 111, and g-timer 112 to time $t_{43}$, $t_\Sigma$ and $t_g$. Since $t_g$ is shortest, the g-timer 112 times out first, capturing filter $\sigma_g$'s 115 output in the g-register 116. Similarly, the 43-timer 110 and Σ-timer 111 time out at $t_{43}$ and $t_\Sigma$ to capture filter $\sigma_{4321}$ 107 and $\sigma_\Sigma$ 117 outputs in the 43-register 118 and Σ-register 119. If this step is not piled up, then all four filter values are ready to be read into the DSP 95 via data bus 121. The pileup inspector can be implemented as taught by WARBURTON-1999 relative to the length of the $\sigma_\Sigma$ filter and will not be discussed further.

As per the cMOS discussion in § 5.1, the invention method does not specifically require that the number of filters equal the number of filter values to be captured. Here we have captured $\sigma_{4321}$ twice.

6.1.2. Synchronous Capture Implementation

Figure 6B:
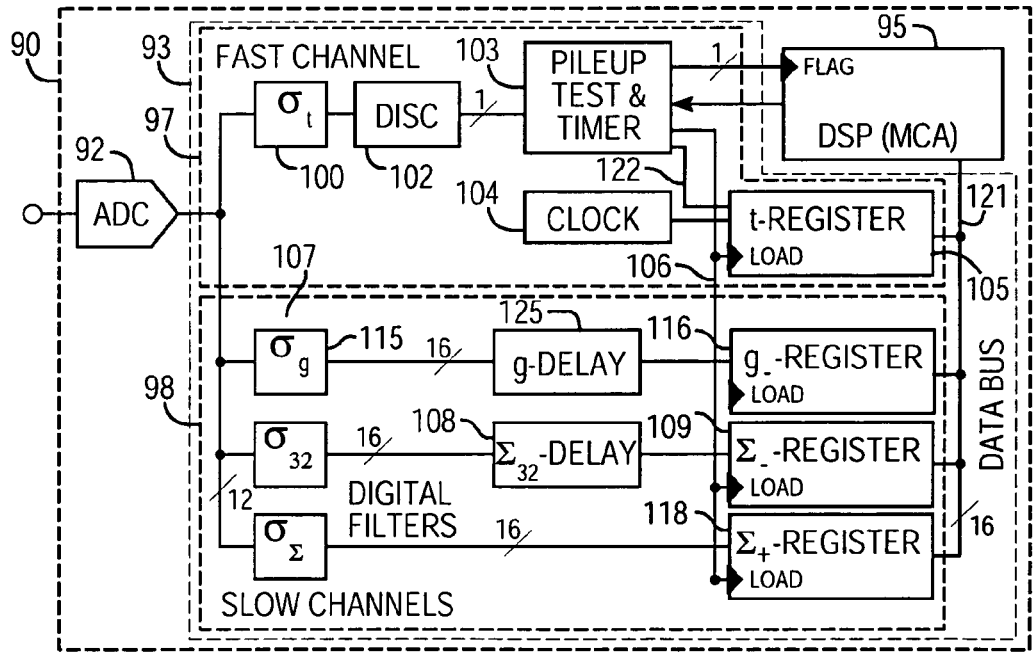

FIG. 6B shows an implementation of Eqn. 27 wherein the three filter values are captured just as the value emerges from the slowest ($\sigma_\Sigma$) filter. The primary physical difference between this implementation and that of FIG. 6A is that the timers 108, 109, and 110 have been eliminated and a second delay (g-delay 125) has been added to compensate for the differences between $t_\Sigma$ and $t_g$ and $t_{32}$ from Eqn. 29. All the remaining parts are the same and carry the same reference numbers as is FIG. 6A. Notice that the trigger line 106 now connects directly to the output registers, rather than through timers as before. For this topology, the functional operation of the pileup test and timer 103 is essentially identical to that presented by WARBURTON-1999.

A disadvantage of this circuit, compared to FIG. 6A, is that relatively long delays may be required, which may consume excessive gate array resources. Recent programmable gates, however, are appearing with blocks of dedicated memory, so this restriction is becoming less significant. One significant advantage of this design is that, because of the synchronous capture, the pileup inspection logic design is much simpler.

6.2. Fully Analog Implementation

Figure 7:
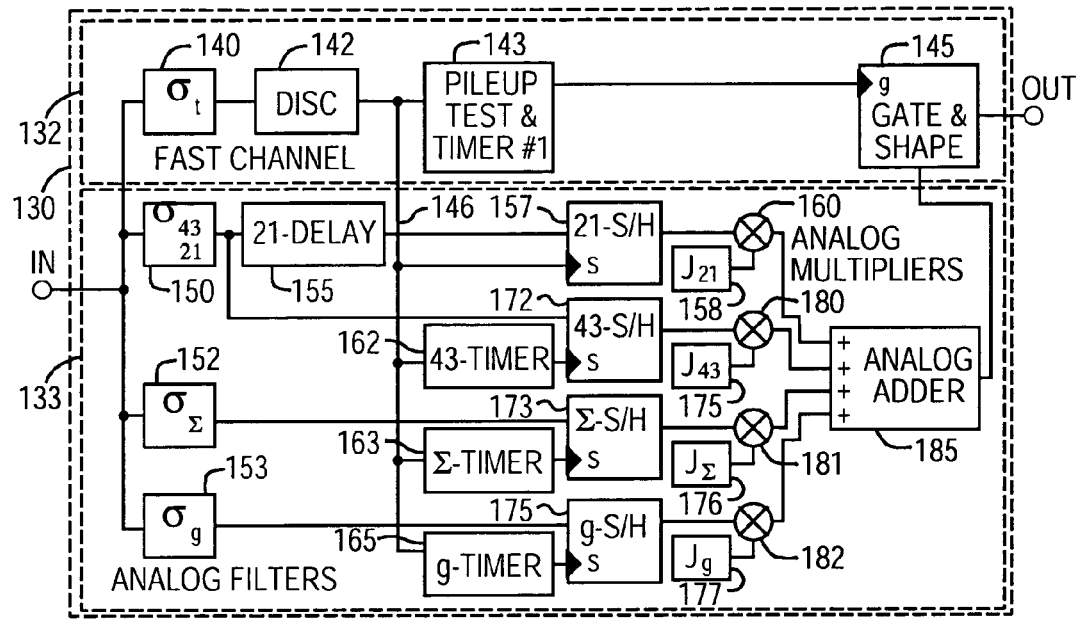
FIG. 7 shows a purely analog circuit which implements the described technique.

While our preferred implementation is fully digital, the method is not inherently digital per se. In certain cases, particularly for very fast step risetimes and very short filter time constants, or to allow a high degree of integration, it may become preferable to use an analog implementation. FIG. 7 shows an analog version of FIG. 6A. The topologies are identical up to the point where sample and hold circuits replace digital registers to capture the filter values, so the operation of the circuit up to this point will be clear to one skilled in the art, given the teaching presented herein. The derivation of the J matrix, of course, will have to proceed using weighting functions appropriate for the analog filters used. Then analog multipliers (160, etc.) and an analog adder 185 are used to implement the $J^{-1}$ coefficients and addition of Eqn. 24C. We note that, for an application with fixed filters, the multiply-and-add function is just an op-amp circuit with appropriate resistor inputs to its summing node. If the pileup tester 143 deems the value good, the gate and shape circuit 145 passes out the adder 185 output in a form suitable for multichannel analysis.

6.3. Hybrid Implementations

Figure 8:
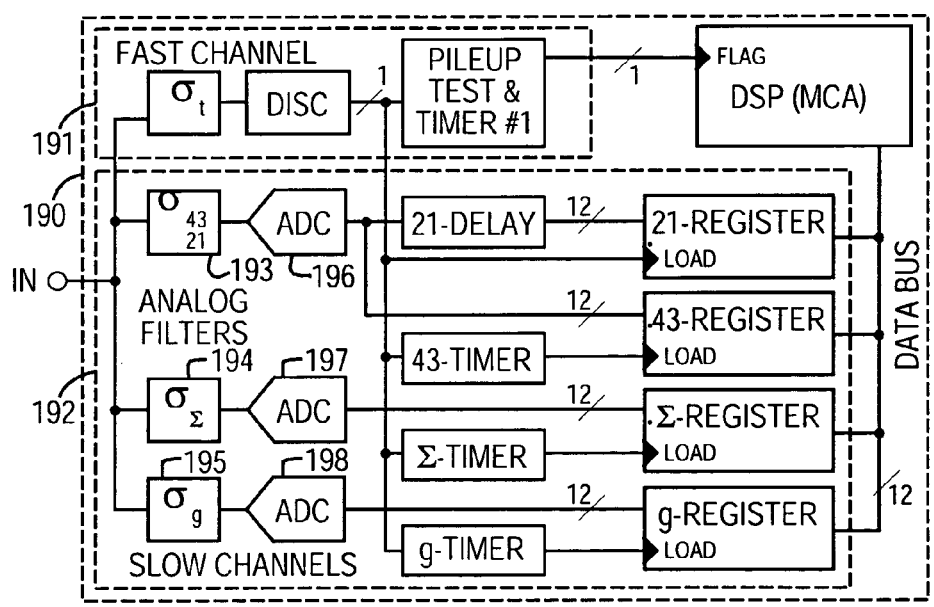
FIG. 8 shows a hybrid analog/digital circuit which implements the described technique.

Shaping filter characteristics which are difficult to implement digitally may be required in some situations where the other benefits of digital processing are still desired. In these situations hybrid implementations may be considered. FIG. 8 shows one such implementation 190. The topology is nearly identical to that of FIG. 6A. The major differences are: 1) that the fast channel 191 is implemented in analog circuitry identical to that of FIG. 7 (although the digital circuit of FIG. 6A could as easily be used); and 2) that, in the slow channel section 192, the digital filters $\sigma_{4321}$ 107, $\sigma_\Sigma$ 117, and $\sigma_g$ 115 have been replaced by analog filters $\sigma_{4321}$ 193, $\sigma_\Sigma$ 194, and $\sigma_g$ 195 followed by ADCs 196, 197, and 198. The time behavior of this circuit is the same as was described for the asynchronous digital circuit in FIG. 6A.

7. Noise Considerations

The Eqns. 24C and 27 filters have higher noise than simple trapezoidal filters since they weight the sampled set of data points with values larger than unity. For example, by breaking the 2 m+g filtered region of Eqn. 27 into its 4 major sub-regions of length m/2 (ignoring the gap g for this argument) and calling running-sums over these regions $\sigma_1$ through $\sigma_4$, we can recompose Eqn. 27 as:

$$Q_{gT} \approx -9.338925E-3\sigma_4 + 2.172123E-2\sigma_3 - 2.172123E-2\sigma_2 + 9.338925E-3\sigma_1. \quad (31)$$

If the noise standard deviation per sample is σ, then the total noise sig($Q_{gT}$) will be $$\text{sig}(Q_{gT}) = (160(8.722E-5\sigma^2) + 160(4.7184E-4\sigma^2))^{0.5} = 0.299\sigma \quad (32)$$

which can be compared to a trapezoidal filter of the same length:

$$sig(Q_1) = \left(160\left(\frac{\sigma}{160}\right)^2 + 160\left(\frac{\sigma}{160}\right)^2\right)^{0.5} = 0.112\,\sigma. \quad (33)$$

Thus the Eqn. 27 filter will have approximately 2.7 times as much electronic noise as a simple trapezoidal filter. The result for the Eqn. 24c filter is similar. For a 4 μs filter, whose electronic noise can be as low as 150 eV, this effect is significant at energies like 100 keV (Fano noise 415 eV) but not at 1 MeV (Fano noise 1,300 eV). And, as peaking times shorten to obtain higher count rates, the problem will worsen at higher energies. We therefore consider how to obtain the benefits of correcting for both ballistic deficit and pole-zero errors without paying the additional filter noise price.

8. Treating Non-Ideal Terms with Baseline Measurements

Our approach is to extend the baseline averaging concept of WARBURTON-1997 to treat time varying terms as well. In the particular case at hand, we would like a way to measure $Q_{23}$ using baseline measurements in spite of the fact that it both exhibits exponential decay and is increased each time an event occurs.

8.1. Derivation of an Example Filter

We begin by developing a simple cMOS TCWFS-filter, composed of three running averages, of lengths m, g, and m, which we make contiguous for the practical reasons of simplifying the math and minimizing deadtime, but not for any fundamental reason. As in previous sections, the length m filters will primarily serve to determine $Q_{gT}$, while the length g filter will be used to eliminate ballistic deficit effects by probing the signal step's risetime region. Starting with Eqns. 19a, 19b, and 19d, these filters are:

$$\sigma_{\Sigma+} = Q_{gT}\overline{A}_m - Q_c\overline{A}_m + Q_{13}A_{1,m} + Q_{23}A_{2,m} + mB_0, \quad (34a)$$

$$\sigma_{g-} = Q_c r + Q_{13}b_1^{-g}A_{1,g} + Q_{23}b_2^{-g}A_{2,g} + gB_0, \quad (34b)$$

and $$\sigma_{\Sigma-} = +Q_{13}b_1^{-m-g}A_{1,m} + Q_{23}b_2^{-m-g}A_{2,m} + mB_0, \quad (34c)$$

where $$\overline{A}_m = (1-\beta)A_{1,m} + \beta A_{2,m}, \hat{A}_m = A_{1,m} + FA_{2,m}, \dot{r} = r_1 + Fr_2 \quad (34d)$$

In Eqns. 34 we now have four types $P_i$ of parameters: types 1 and 2 ($P_1$, $P_2$), as before, which include $Q_{gT}$, $Q_c$, and $Q_{13}$; type 3 ($P_3$), $Q_{23}$ and $B_0$, which describe the preamplifier's "non-ideal" behavior, $Q_{23}$ being the amplitude of its second pole's response to any previous steps and $B_0$ being the DC offset; and type 4 (P4): all the remaining fixed parameters (e.g., $\tau_1$, $\tau_2$, $\beta$, $m$, $g$) which describe both the filters' and the preamplifier's transfer functions. We will treat $Q_{gT}$, $Q_c$, and $Q_{13}$ as unknowns to be recovered from a particular TCWFS-filter measurement, with the intention of independently determining $Q_{23}$ and $B_0$ from baseline measurements. Eqns. 34 are simple enough to be solved by direct elimination of unknowns to get:

$$Q_{gT} = \overline{A}_m^{-1}\left[\sigma_{\Sigma+} - K\sigma_{\Sigma-} + \frac{\hat{A}_m}{\dot{r}}\sigma_{g-}\right]_q - \overline{A}_m^{-1}[LQ_{23} + MB_0], \quad (35a)$$

where $$K = b_1^{m+g} + \frac{\hat{A}_m}{\dot{r}}\frac{A_{1,g}}{A_{1,m}}b_1^m, \quad (35b)$$

$$L = A_{2,m}\left[1 - \left(\frac{b_1}{b_2}\right)^{m+g} + \frac{\hat{A}_m A_{2,g}}{A_{2,m}\dot{r}}b_2^{-g} - \frac{\hat{A}_m A_{1,g}A_{2,m}}{A_{1,m}\dot{r}}b_1^{-g}\left(\frac{b_1}{b_2}\right)^{m+g}\right], \quad (35c)$$

and $$M = m\left[1 - b_1^{m+g} + \frac{\hat{A}_m}{\dot{r}}\left[\frac{g}{m} - \frac{A_{1,g}}{A_{1,m}}b_1^m\right]\right]. \quad (35d)$$

The constants K, L, and M depend only on type 4 parameters, which are assumed to be time independent for a particular detector-preamplifier pair and set of filter lengths. Eqn. 35A is therefore a transform function (the first bracketed term) between the Eqn. 34 TCWFS detector charge $Q_{gT}$, minus an error term $[LQ_{gT} + MB_0]\overline{A}_m^{-1}$, that is the transform's response to the non-ideal (NI) preamplifier terms $Q_{23}$ and $B_0$. Using Eqn. 35a thus requires that $Q_{23}$ and $B_0$ to be determined at a time appropriately correlated to the cMOS capture (e.g., time 1 in FIG. 4) and substituted into the error term to produce an accurate value of $Q_{gT}$. The cMOS capture itself can be physically implemented using any of the approaches described above. The subscript q on the bracketed weighted sum of cMOS values indicates that this was an "area" cMOS TCWFS-filter capture of the area filter set to determine deposited charge.

8.2. Single Measurement Error Term Correction

A simple, although not the lowest noise, method to estimate the error term is to measure it locally for each cMOS energy capture by making the same Eqn. 34 cMOS filter capture in close time proximity but without a step-like signal present in the filters, so that $Q_{gT}$ is zero. Then, from Eqn. 35a, with $Q_{gT}$ equal to zero, we have:

$$\overline{A}_m^{-1}[LQ_{23} + MB_0]_b = \overline{A}_m^{-1}\left[\sigma_{\Sigma+} - K\sigma_{\Sigma-} + \frac{\hat{A}_m}{\dot{r}}\sigma_{g-}\right]_b, \quad (36)$$

where the subscript b is for "baseline," called so since, as shown, this "baseline" cMOS filter capture produces the transform's baseline response to the preamplifier's non-ideal terms. We may also call such a measurement a "null charge" or "null energy" ("null area" in the general case) capture since it is made when $Q_{gT}$ is zero. Substituting Eqn. 34c into Eqn. 33a gives:

$$Q_{gT} = \overline{A}_m^{-1}\left[\left[\sigma_{\Sigma+} - K\sigma_{\Sigma-} + \frac{\hat{A}_m}{\dot{r}}\sigma_{g-}\right]_q - \left[\sigma_{\Sigma+} - K\sigma_{\Sigma-} + \frac{\hat{A}_m}{\dot{r}}\sigma_{g-}\right]_b\right], \quad (37)$$

where the subscript q labels the TCWFS-filter charge measurement to be corrected.

This correction is moderately simple and has been found to work acceptably in some cases. However, if $Q_{23}$ is large, as may be true at high output step rates, then time decay effects in $[LQ_{23}+MB_0]_b$ may still be significant. This can be approximately corrected by measuring the time interval $\delta t = t_e - t_b$ (in clock ticks $\Delta t$) between the energy and baseline captures and correcting by the decay term $b_2^{\delta t}$, to obtain:

$$Q_{gT} = \overline{A}_m^{-1}\left[\left[\sigma_{\Sigma+} - K\sigma_{\Sigma-} + \frac{\hat{A}_m}{\dot{r}}\sigma_{g-}\right]_q - b_2^{\delta t}\left[\sigma_{\Sigma+} - K\sigma_{\Sigma-} + \frac{\hat{A}_m}{\dot{r}}\sigma_{g-}\right]_b\right]. \quad (38)$$

In this method, if $B_0$ is truly a constant and the time interval $\delta t$ between the energy and baseline captures is fixed, then the error term $MB_0 b_2^{\delta t}$, will also be a constant and merely produce an offset in the spectrum.

Eqn. 38 has two significant problems: 1) increased noise, due to the noise in the single baseline measurement, which is the same size as in the measurement itself and degrades resolution by sqrt(2); and 2) it increases deadtime by at least a factor of two if the two measurements are independent and so separated by at least 2 m+g in time. It is therefore useful to be able to make multiple, independent measurements of $B_0$ and $Q_{23}$ and average them in order to reduce their variance. We present a method for doing so below.

8.3. The Time Compensated Baseline Model

In making filter derivations throughout this work, we have assumed that we have an accurate preamplifier model in terms of its several decay constants and DC offset. We therefore take the logical step and use precisely the same model to correlate measurements made at different times so they may be averaged. Thus, if we measure $Q_{13}$, $Q_{23}$, or $B_0$ at one time, then their values $\Delta t$ clock cycles later will be given by $b_1^{\Delta t}Q_{13}$, $b_2^{\Delta t}Q_{23}$, and $B_0$, respectively, unless a step arrives within the interval $\Delta t$. In that case, at the end of the step arrival time (e.g., time 1 in FIG. 4), we increment $Q_{13}$ by $(1-\beta)Q_{gT}$, $Q_{23}$ by $\beta Q_{gT}$, and $B_0$ by zero, after which their exponential decays will continue as before. For the purposes of baseline averaging, then, $Q_{13}$, $Q_{23}$, or $B_0$ become "time-compensated" model (or "TC-model") parameters, whose averaged values are $<Q_{13}>$, $<Q_{23}>$, and $<B_0>$, respectively.

If we make measurements of $B_0$ and $Q_{23}$ from time to time, we can now update our estimate of $B_0$ simply by using the method of WARBURTON-1997 or some other averaging scheme. For $Q_{23}$ our TC-model now gives:

$$Q_{23}(i) = b_2^{\Delta t_i} Q_{23}(i-1), \text{tm} \quad (39)$$

so, if $<Q_{23}>_{i-1}$ represents an "averaged" estimate of $Q_{23}(i-1)$, last measured at time $t_{i-1}$, we update $<Q_{23}>_i$, using a new baseline measurement of $Q_{23}(i)$ at time $t_i$, by the following extension of Warburton and Hubbard's Eqn. 7, where $\Delta t_i = t_i - t_{i-1}$:

$$\langle Q_{23}\rangle_i = \frac{N-1}{N}\left(b_2^{\Delta t_i}\langle Q_{23}\rangle_{(i-1)}\right) + \frac{Q_{23}(i)}{N}. \quad (40)$$

Equivalently, we update $<Q_{23}>$ for the arrival of an impulse signal of charge $Q_{gT}(i)$ at time $t_i$ using:

$$<Q_{23}>_i = b_2^{\Delta t_i}<Q_{23}>_{(i-1)} + \beta Q_{gT}(i). \quad (41)$$

If required, $Q_{13}$ can be similarly extended from its last time of measurement by replacing $b_2$ with $b_1$ in Eqn. 39.

$<Q_{23}>$ and $<B_0>$ are used with an charge cMOS TCWFS-filter capture to determine $Q_{gT}$ using Eqn. 35a as follows. First, $<B_0>$ simply replaces $B_0$ in the equation. $<Q_{23}>$, however, has to be extended from its time of last update $t_{i-1}$ to the present capture time $t_i$ using Eqn. 39, according to our TC-model, where $\Delta t_i = t_i - t_{i-1}$:

$$Q_{gT} = \overline{A}_m^{-1}\left[\sigma_{\Sigma+} - K\sigma_{\Sigma-} + \frac{\hat{A}_m}{\hat{r}}\sigma_{g-}\right]_q - \overline{A}_m^{-1}\left[Lb_2^{\Delta t_i}\langle Q_{23}\rangle_{i-1} + M\langle B_0\rangle\right] \quad (42)$$

Because $<Q_{23}>$ and $<B_0>$ can be determined by averaging over many baseline measurements, the noise contribution of the correction term in Eqn. 42 can be made much smaller than in the single baseline correction procedure of § 8.2. Since the weighting function of $\sigma_{g-}$ is small compared to unity, the measurement noise in Eqn. 42 will then be determined primarily by $\sigma_{\Sigma+}$ and $\sigma_{\Sigma-}$, and will be approximately the same as for a trapezoidal filter of the same peaking time and about a factor of sqrt(2) better than by using Eqn. 38. Furthermore, because a baseline cMOS or TCWFS-filter capture can now be made at any time the interval between successive steps is adequately long, rather than requiring one in conjunction with each charge cMOS filter capture, the method's deadtime is cut in half: to that of a single cMOS filter capture.

8.4. Measuring the Non-Ideal Terms $Q_{23}$ and $B_0$

An effective way to measure $Q_{23}$ at time $t_i$ is by making a baseline cMOS TCWFS-filter capture, per Eqn. 36, with the difference now that the times $t_i$ need no longer be correlated with charge cMOS captures. Using an averaged value $<B_0>$ for $B_0$, plus computed values for L and M, we can then solve $[LQ_{23}+MB_0]_b$ for $Q_{23}$:

$$Q_{23} = \frac{1}{L}\left[\sigma_{\Sigma+} - K\sigma_{\Sigma-} + \frac{\hat{A}_m}{\hat{r}}\sigma_{g-}\right]_b - \frac{M}{L}B_0 \quad (43)$$

and use it to update $<Q_{23}>_i$ using Eqn. 40.

We normally expect $B_0$ to be stable and nominally rate independent, so that $<B_0>$ can be measured with no input counts to the detector and used thereafter to obtain $Q_{23}$ values. However, to compensate for any temperature and/or rate related changes in $B_0$, it is prudent to also measure $B_0$ from time to time and update our estimate of $<B_0>$. One approach is to use pairs of baseline measurements, separated in time by $\Delta t$, where, if we denote the error term E as:

$$E = [LQ_{23} + MB_0]_b = \left[\sigma_{\Sigma+} - K\sigma_{\Sigma-} + \frac{\hat{A}_m}{\hat{r}}\sigma_{g-}\right]_b. \quad (44)$$

then, measuring $E_i$ and $E_{i-1}$ separated by $\Delta t = t_i - t_{i-1}$, we have, from Eqn. 39:

$$B_{0,i} = (E_i - b_2^{\Delta t_i} E_{(i-1)})(M(1-b_2^{\Delta t_i}))^{-1}. \quad (45)$$

$B_{0,i}$ measurements can be averaged, as noted above, to obtain $<B_0>$, a low variance estimation of $B_0$, for use in Eqn. 35a. From Eqn. 45, it is clear that the longer the time interval $\Delta t$, the more accurate the measurement of $B_0$ will be, since both the numerator and denominator are small differences of large numbers. In any case, enough values $B_{0,i}$ can be averaged so that errors in $<B_0>$ do not contribute substantially to the error in $Q_{gT}$.

8.5. Dealing with Model Parameter Drifts

For this compensation scheme to work well, the $P_4$ parameter β needs to be precisely known and stable over time. Else both the extrapolations of $Q_{13}$ and increments in $Q_{23}$ will incorporate systematic errors which will propagate into the $Q_{gT}$ calculations. The proposed $Q_{23}$ baseline measurements offer a method to monitor β and either refine its value or track it in time.

In Eqn. 40 we update our average $<Q_{23}>_i = b_2^{\Delta t}<Q_{23}>_{i-1}$ at time $t_i$ with the measured value $Q_{23}(i)$. However, we can also record the differences between these two values and compute their mean $<\Delta Q_{23}>$ over time. If $<\Delta Q_{23}>$ is not zero, then a systematic error exists and we can adjust β using:

$$\delta\beta = <\Delta Q_{23}>/S_\beta, \quad (46)$$

where the slope $S_\beta = d<\Delta Q_{23}>/d\beta$ is previously obtained from calibration runs, made at system setup time, wherein β is systematically adjusted and the resultant $<\Delta Q_{23}>$ values recorded, so that $S_\beta$ can be calculated. Similar methods can be used to monitor and correct other $P_4$ parameters such as $\tau_1$ and $\tau_2$, if appropriate.

9. Circuits Implementing the Continuous TCWS-Filtering Method

The contingent method of capturing a weighted signal sum value presented above has been tested and applied in a variety of situation and found to work well. However, the time required to pass the multiple secondary signal samples to the digital signal processor, plus the time required to form the weighted signal sum, has been found to set a definite limit on the maximum rate at which events can be processed.

9.1. Moving the Weighting and Summing Operations into Dedicated Logic

Figure 9A:
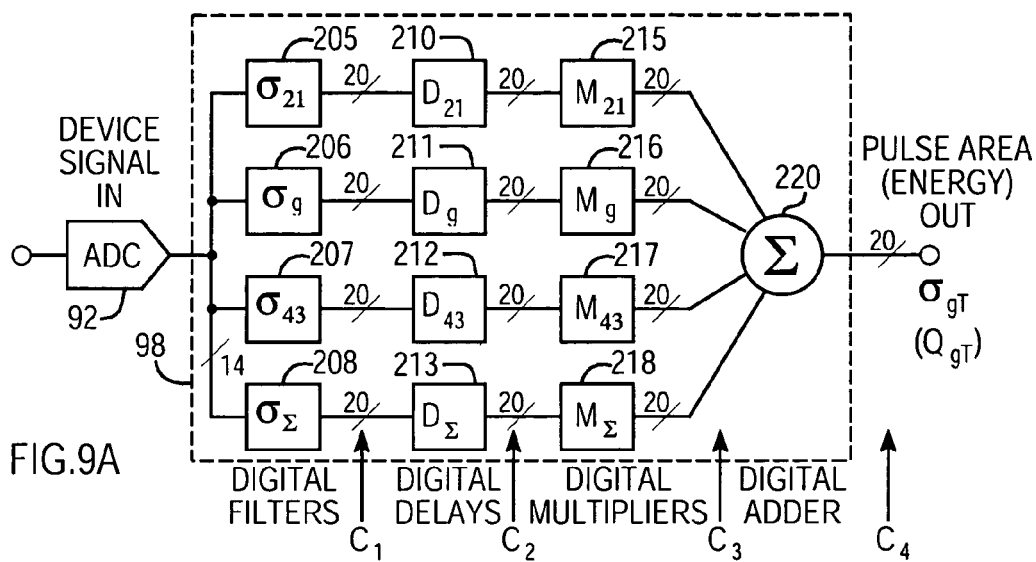
FIG. 9A shows a schematic of the invention method implemented in a gate array as a continuously operating time correlated, weighted filter sum process.

This limitation can be avoided by placing the multiplication (weighting) and addition (summing) steps into dedicated logic (typically the same gate array that is performing the digital filtering and delaying operations), where they can be carried out in parallel once per clock cycle. FIG. 9A shows a schematic of the resultant dedicated logic if the four filters 205–208 of Eqn. 23c are followed by appropriate delays 210–213 to implement a set of cMOS secondary signal paths that include weights as well as delays. The weighting coefficients are applied by the multipliers 215–218 and the summation is carried out by an adder 220. The resultant, continuously processing circuit 98 thus becomes a drop-in replacement for the same functional block 98 in the contingent capture spectrometer shown earlier in FIG. 6A. A circuit of this type can be readily implemented in many of the higher performance field programmable gate arrays that are commercially available, for example in the Xilinx Vertex series.

9.2. Order of Operations is not Important

In the schematic in FIG. 9A, each secondary signal path connected to the adder provides an individual filter term in Eqn. 23a, appropriately delayed and weighted. Since the operations are independent for each path, it is clear that the order of operations may be rearranged in any given path without affecting the final result $\sigma_{gT}$. Thus it is not important whether the signal is filtered, then delayed and then weighted, as the operations were conceptually presented, or whether some other order is adopted (e.g. weighting, delaying and then filtering). In practice, therefore, the operations should be arranged in the order that is easiest to implement.

In the schematic in FIG. 9A, each secondary signal path connected to the adder provides an individual filter term in Eqn. 23a, appropriately delayed and weighted. Since the operations are independent for each path, it is clear that the order of operations may be rearranged in any given path without affecting the final result $\sigma_{gT}$. Thus it is not important whether the signal is filtered, then delayed and then weighted, as the operations were conceptually presented, or whether some other order is adopted (e.g. weighting, delaying and then filtering). In practice, therefore, the operations should be arranged in the order that is easiest to implement.

Figure 9B:
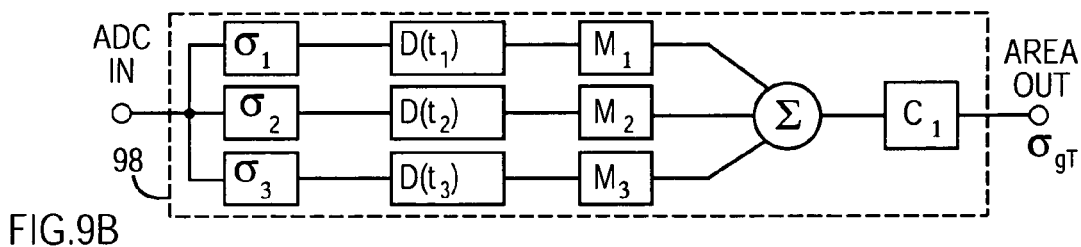
FIGS. 9B, 9C, 9D, and 9E show schematics of four implementations of the invention method that achieve equivalent functionality through different arrangements of operations in their secondary signal paths.
Figure 9C:
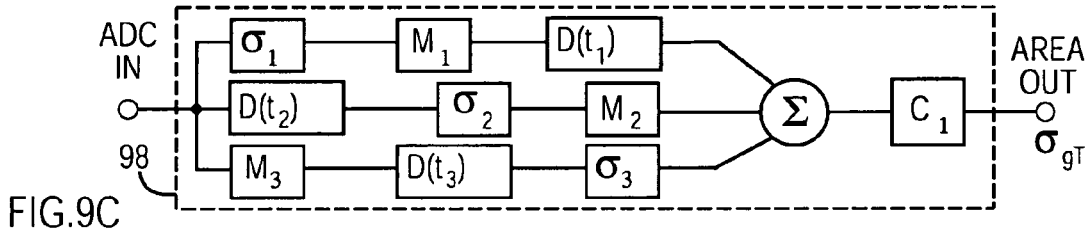

The schematics shown in FIGS. 9B through 9E elaborate upon this point. FIG. 9B shows a simplified version of the processing block 98 of FIG. 9A, where the ADC input signal is directed into only three secondary signal paths. Within possible processing operations that can be applied to the secondary signals are indicated by the sub-blocks labeled ($\sigma$ for filtering, D for delaying, M for multiplying or weighting, $\Sigma$ for summing, and C for capturing. In FIG. 9B the order of operations is the same as in FIG. 9A and the same in all signal paths, namely filtering, delaying, weighting, summing and capturing. This is a continuously processing filter, so that the capturing step requires a control, as we shall discuss, in order to properly obtain the energy of the input event. We note that the delays in the three paths introduce time delays of $t_1$, $t_2$, and $t_3$ respectively. In FIG. 9C the sequences of filtering, delaying and weighting operations have been reordered in the three secondary signal paths. As discussed above, the continuous signal produced by the summing operating is unchanged from FIG. 9B.

Figure 9D:
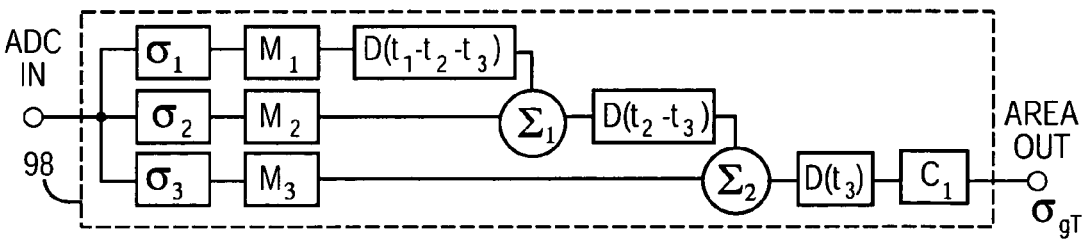

In the circuit of FIG. 9D an additional summation point has been introduced in order to allow shorter (and typically cheaper) delays to be used. The assumption in moving from FIG. 9B to FIG. 9D is that the secondary signal paths were ordered so that the delay times $t_i$ initially satisfied the inequality $t_1 > t_2 > t_3$. FIG. 9D demonstrates that multiple summation points are allowed and that they can be distributed within the secondary signal paths. The circuit in FIG. 9D is also a continuously processing circuit.

Figure 9E:
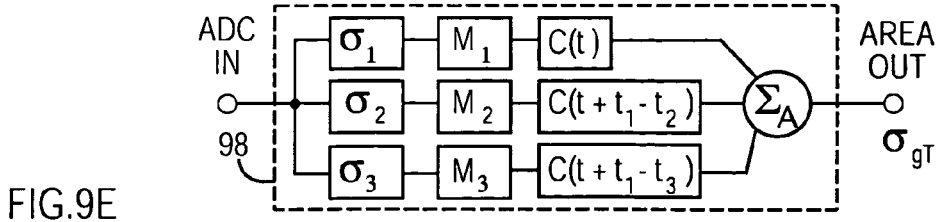

FIG. 9E shows an asynchronous capture circuit modeled on the circuit of FIG. 6. Here the delays of FIG. 9B have been replaced by timed capture operations, where the times between captures are adjusted so that the captured secondary signal samples bear the same time relationships to one another as the continuous secondary signals entering the summation point in FIG. 9B. We observe that the summation point in FIG. 9E performs asynchronous summations because the terms that it adds arrive at different time. It is accordingly labeled $\Sigma_A$ to emphasize this point. The final, single value produced by all four circuits of FIG. 9B–FIG. 9E after all summing and capturing operations is identical and this point serves to emphasize the flexibility of the invention method.

9.3. Output of Optimized TCWFS-Filtering is a Flat-Topped Trapezoid

An obvious question is: what does the output of an optimized, continuously-filtering block look like at the summation point 220? The answer lies in our demonstration that the recovered values of $Q_{gT}$ are independent of the placement or shape of the step-like pulse in our filter gap, provided that the pulse's risetime is completely contained within the gap. This implies that the output of the filter block will be a constant over the period that the pulse's leading edge passes through the risetime sampling filter $\sigma_g$. On the other hand, since there is no output when the leading edge is not present in any filter, the overall shape must be essentially trapezoidal, with a rising side, a flat-top, and a falling side.

Figure 10:
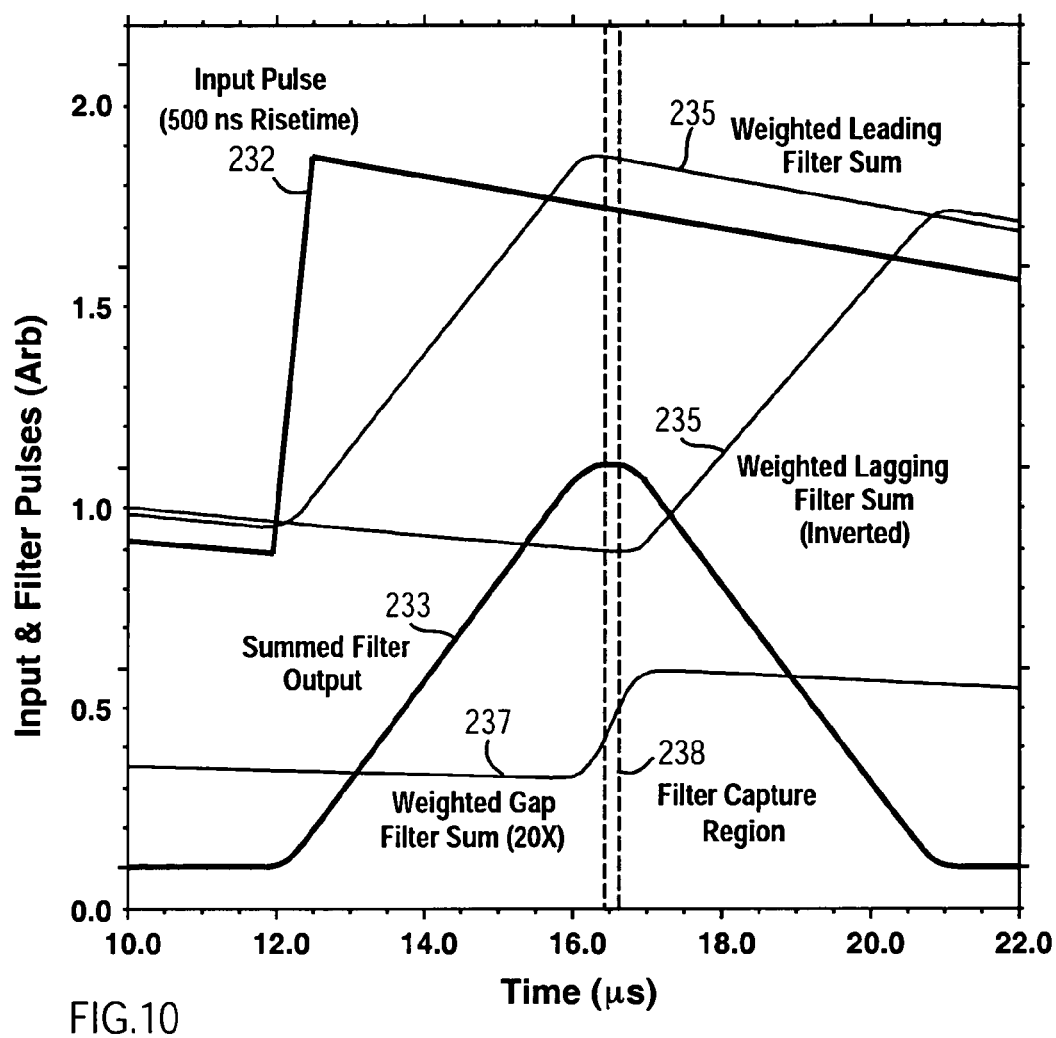
FIG. 10 shows input, secondary and output signals from a simple continuously operating time correlated, weighted filter sum filter of the type shown in FIG. 9A.

FIG. 10 shows modeled results demonstrating this conclusion. The figure shows an input pulse 232 with a 500 ns risetime. Although it is not visible on this timescale, the pulse data, and all filter data, have been decimated by a factor of 2, so the time step between samples is 50 ns. The summed filter output 233 is the output of a filter comprising three terms: a leading running average filter of length 4 µs, a gap running average filter of length 1 µs, and a lagging running average filter of length 4 µs. The baseline of this filter is exactly zero and at its peak it has 5 values (over 250 ns) that are exactly 1.000000 to one part in a million. Its rise and fall times are 4 µs. The weighted outputs of the leading 235, lagging 236 and gap 237 filters are also shown. These, then, are the cMOS secondary signals as they arrive at the summation point 220. The lagging filter output is shown inverted, so that it may be directly compared to the leading filter output. They deviate substantially only in the region where the summed filter output has its trapezoidal peak. We observe that the weighted gap filter output 237 is a small correction signal whose amplitude is only about 1% of the other two terms. It has been amplified by a factor of 20 in the figure for visibility.

It is important to note that, while the output filter capture region 238 is easy to detect from the peak of the summed filter output, there are no characteristic features in any of the secondary signals (leading, lagging and gap filter outputs) upon which a capture might be reliably based. It is only the sum of these three signals that produces the desired accurate flat-top output signal. However, because filtering, delaying, and weighting are all deterministic processes, the time to the filter capture region following the arrival of a step in the input signal is well determined. Hence timing methods work very well when it is desirable to capture the individual secondary signals in contingent weighted sum filtering, and we have already described several circuits employing this principle.

Figure 11A:
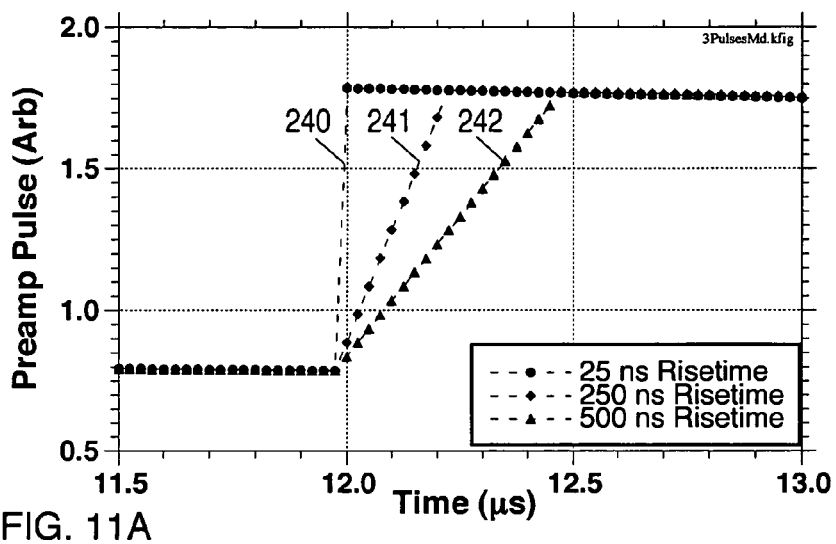
FIG. 11A shows generated output device signals with three different rise times.

Next we will examine the behavior of a TCWFS-filter's flat-top region in more detail. In FIG. 11A we show the leading edges of three modeled (i.e. noise-free) input signal pulses with risetimes of 25, 250 and 500 ns (traces 240, 241, and 242 respectively), and a single 50 µs decay time. The pulses were then filtered using a TCWFS-filter similar to the filter used to produce FIG. 10, but having a 2.80 µs risetime and 700 ns gap.

Figure 11B:
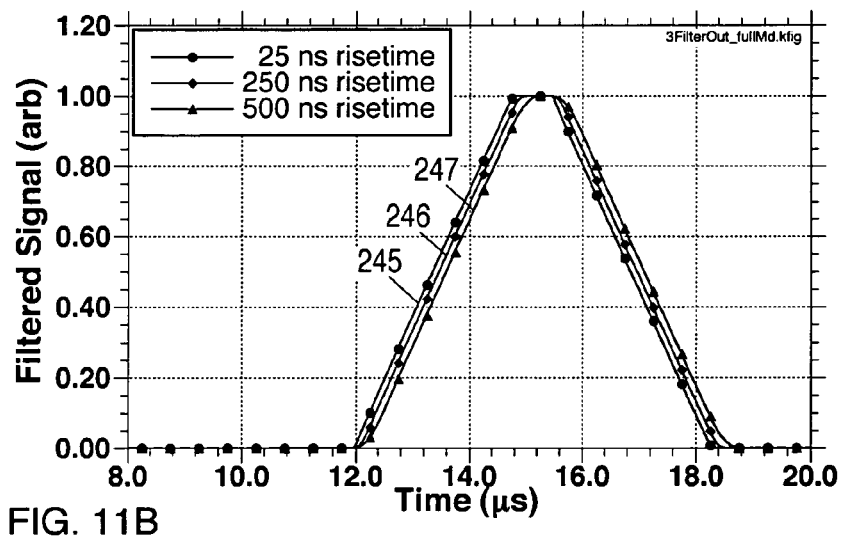
FIG. 11B shows the modeled response of the circuit of FIG. 9A to the signals in FIG. 11A.
Figure 11C:
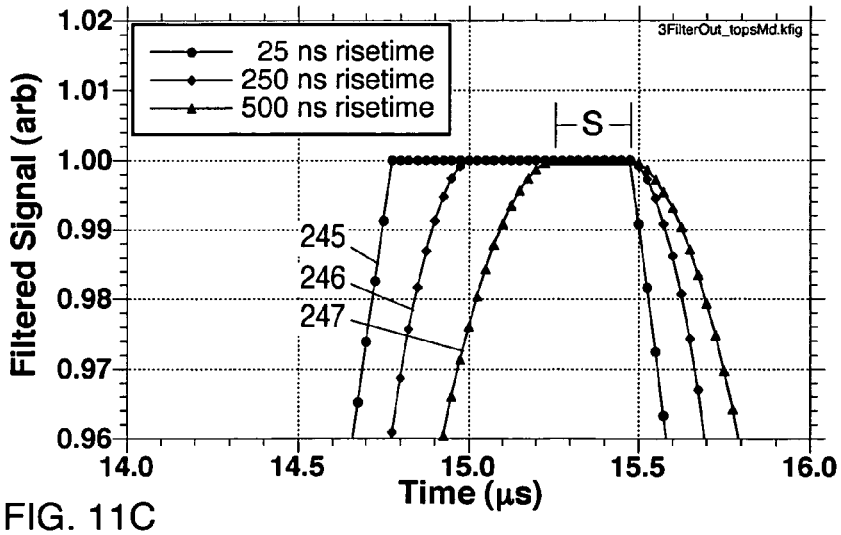
FIG. 11C shows an enlarged view of the flat-top regions of the signals in FIG. 11B.

FIG. 11B shows the filter's outputs, which are trapezoidal for all three signal risetimes. FIG. 11C shows an enlargement of the trapezoids' flat-tops. Outputs 245, 246, and 247 correspond to the inputs 240, 241, and 242 respectively). Three features are clear. First, the longer the risetime, the more rounded the output pulse is towards its peak. Second, the length S of the flat-top is, as we would expect, equal to the difference between the gap length and the pulse risetime. Finally, the outputs all converge to exactly the same value. These flat-tops are, in fact, very flat indeed, as we can find by reference to Table 1. As we saw there, a high quality TCWFS-filter output may be insensitive to risetime variations at levels as low a 1 part per million, which is also a measure of how flat the top will be as either the risetime changes or the pulse moves about within the gap. Given this flatness, we can therefore capture a sample from which to recover $Q_{gT}$ in either of two ways: first by capturing a value in response to detecting a step-like pulse; or, second, by looking for peaks in the summed signal output and capturing a peak maximum. In the simplest of cases one could even do as was done in the early days of analog processing and simply look for output pulses with a peak detect and capture circuit. Clearly, in cases where there is a significant data rate, it will generally be preferable to also implement fast channel pulse detection and pileup inspection circuitry, but doing so is not a necessary part of the technique. Also, as noted earlier, capturing a "peak sample" in response to detecting a pulse may be carried out using either continuous or contingent TCWFS-filtering. In the latter case, as we have described, the sampling will actually be implemented in the cMOS secondary signal paths and these samples will then be combined via a "contingent" summation operation to produce the desired single peak value. We thereby understand that, in the contingent approach, the order of the summing and capturing operations are reversed, compared to the continuous approach. In certain cases, the two approaches could even be mixed, with capture occurring before the summation operation in some signal paths and after it for others. All that is really required is that each secondary signal be captured after the filtering and delaying operations in its signal path, realizing, as noted above, that the capture method can be part of the method used to implement a required delay.

9.4. Example Implementations

Figure 12:
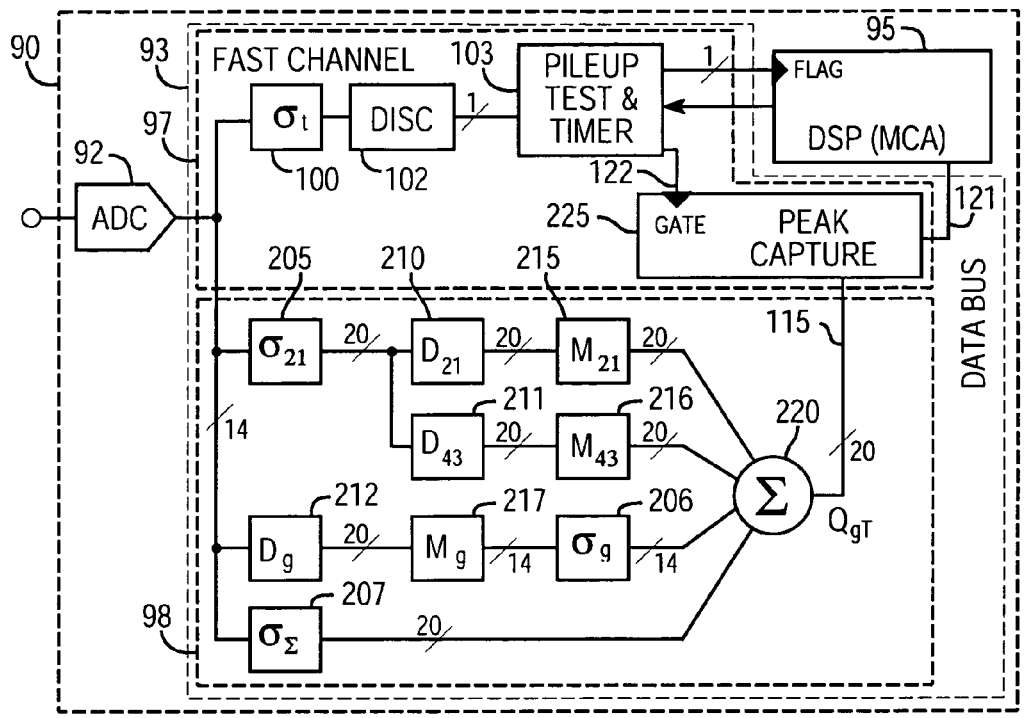
FIG. 12 shows a simplified version of the circuit in FIG. 9A integrated into a complete spectrometer using timed peak capture.

FIG. 12 shows the circuit of FIG. 6A wherein the block 98 has been replaced with a continuously operating TCWFS-filtering unit similar to the one shown in FIG. 9A. We notice that the rest of the circuit is essentially identical, with one exception. Because there is only a single value to capture, all of the digital registers (105, 109, 116, 118, and 119) have been replaced by a single gated peak capture register 225. This register is triggered by the pileup test and timer module 103 in a manner exactly similar to the described operation of FIG. 6A in order to capture a value from TCWVFS-filtering unit 98 in the flat-top of its output.

This implementation illustrates some of the flexibility that is possible in creating the set of secondary signal paths. In the first case, a single digital filter ($\sigma_{21}$) has two different delay and multiply chains applied to its output in order to produce two of the required set of four secondary-signals. In the second case, the gap filter ($\sigma_g$) is preceded by its delay and weighting stages because fewer resources are required to implement them for the 14 bit ADC signal than for the 20 bit output from the gap filter.

Figure 13:
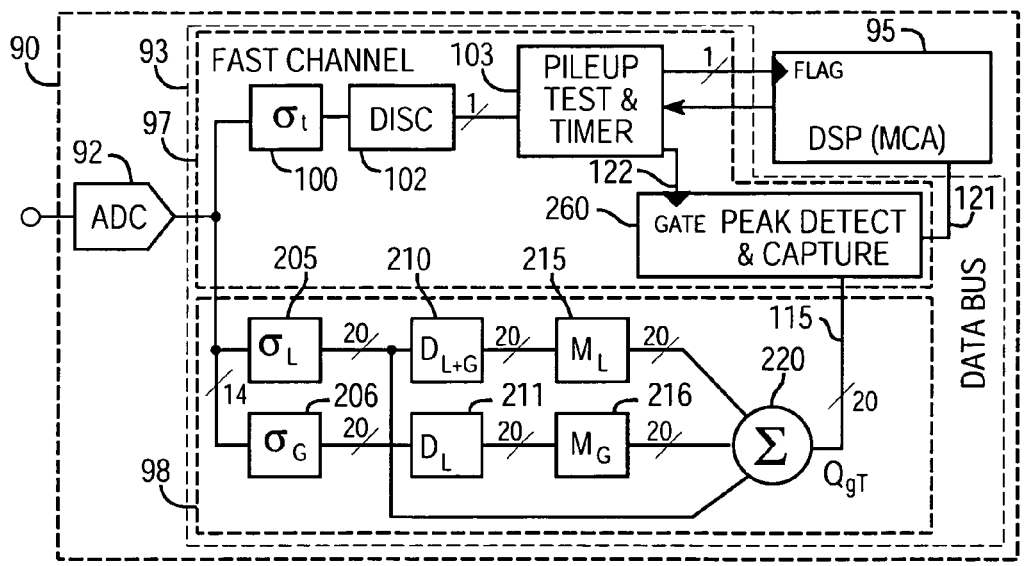
FIG. 13 shows a shows a different simplified version of the circuit in FIG. 9A integrated into a complete spectrometer using peak detect and capture.

FIG. 13 shows an even simpler circuit that implements the same filter that was used to produce FIGS. 10 and 11. Its TCWFS-filtering unit 98 has only two digital filters: a running sum $\sigma_L$ of length L (the peaking time) and a running sum $\sigma_G$ of length G (the gap). $\sigma_L$ is used in two signal paths, with one path delayed by L+G with respect to the other to form a trapezoidal filter of risetime L (the weighting factor $M_L$ is negative). $\sigma_G$ is used in only a single path, with a delay of L, to capture the region in the other filter's gap. With appropriate weighting coefficients $M_L$ and $M_G$, the summation will be proportional to $Q_{gT}$. Note that, by scaling the weighting coefficients so that one is equal to unity, we avoid having to implement a third multiplication, saving resources, at the cost of having to rescale our spectrum later in the DSP 95 after data collection is complete.

To demonstrate how it is done, FIG. 13 implements a different method of sampling the time correlated, weighted filter sum-filtering unit 98 than FIG. 12 does. Here the gated peak capture circuit 225 has been replaced by a gated peak detect and capture circuit 260 whose function is to compare each input value with a test value and, if the test value is smaller, to replace it with the input test, so long as the gate is asserted. Reasserting the gate sets the initial test value to zero. In this circuit the pileup test and timer 103 determines whether a filtered pulse is piled up or not and, if not, gates on the peak detect and capture circuit 260 to capture a value from the flat-top in the TCWFS-filtering unit's 98 output. As noted earlier, the pileup inspection part of this circuit is not a necessity, but has become standard in modern spectrometers because of the improved spectral quality that arises from eliminating pileup events.

9.5. Using Implicit Filter Delays to Replace Explicit Delays

As noted earlier, filtering is a convolution operation that encodes signal data over a time period that may either be of finite, as in finite impulse response (FIR) filters, or infinite duration (as in infinite impulse response (IIR) filters. By utilizing this characteristic, it is thereby possible to implement TCWFS-filters without the use of explicit delay elements. The following example shows how this would be done for the simple running average filter used to produce FIGS. 10 and 11. That filter can be written as:

$$F_i = A \cdot \Sigma_+ + B \cdot \Sigma_g + C \cdot \Sigma_- \quad (47)$$

where $\Sigma_+$, $\Sigma_g$ and $\Sigma_-$ are the leading, gap, and lagging running average sums, respectively. Explicitly, these sums are:

$$\Sigma_+ = \sum_{j=i-L+1}^{i} y_j, \quad \Sigma_g = \sum_{j=i-L-M+1}^{i-L} y_j, \quad \Sigma_- = \sum_{j=i-2L-M+1}^{i-L-M} y_j \quad (48)$$

where the outputs of the $\Sigma_g$ and $\Sigma_-$ filters must be delayed by L and L+M, respectively, in order to be combined with the output of $\Sigma_+$. If we now define two new filters, $\Sigma_{+g}$ and $\Sigma_{+gM}$ by:

$$\Sigma_{+g} = \sum_{j=i-L-M+1}^{i} y_j, \quad \Sigma_{+gM} = \sum_{j=i-2L-M+1}^{i} y_j \quad (49)$$

then it is clear that we can re-express Eqn. 47 as:

$$F_j = (A-B-C)\Sigma_+ + (B-C)\Sigma_{+g} + C\Sigma_{+gM}, \quad (50)$$

where the outputs of the new filters $\Sigma_{+g}$ and $\Sigma_{+gM}$ can be captured simultaneously with the output of filter $\Sigma_+$. Thus, by using the implicit delays in the filters $\Sigma_{+g}$ and $\Sigma_{+gM}$, we have eliminated the need for the explicit time delays required by the formulation of Eqn. 47.

10. Two-Pole Example Application to CsI(T1) scintillators

Figure 14:
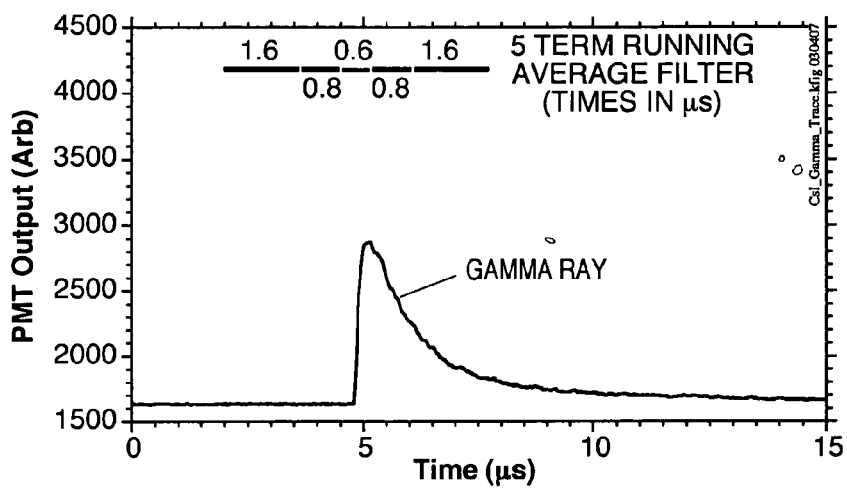
FIG. 14 shows an output trace from a CsI(T1) scintillator/PMT detector showing two decay lifetimes.

In the majority of applications described above, the signals were nominally single-pole outputs with perhaps a small second-pole term as an error term in the desired output. The TCWFS-filtering method was originally developed to deal with such signals, and it does so well. However, the method is not restricted to such signals, as we noted earlier and the following example demonstrates. In this case we will look at signals from CsI(T1) scintillators coupled either to photodiodes or photomultiplier tubes. It has been known for some time that CsI(T1) is one of a class of scintillators whose light output decays with at least two different decay time components [SKULSKI-2001], a short component of about 600 ns and a long component of about 4 μs. FIG. 14 shows an output pulse from CsI(T1) when stimulated by a gamma-ray. The shorter and longer components are clearly visible in the output, which is readily described as a two-pole (2-P) device. As a scintillator, CsI(T1) has several properties that make it superior to the more commonly employed NaI(T1) scintillator, which has only a single decay time. The presence of the second decay time, however, has so far precluded the useful application of CsI(T1) at significant counting rates because it interferes sufficiently with the operation of existing digital and analog shaping filters, so that energy resolution degrades rapidly above 10,000 counts/sec (cps) and becomes unusable above 20,000 cps.

To work with CsI(T1) at higher rates we developed a TCWFS-filter comprising five running average terms. The light output from CsI(T1), as seen in FIG. 14, is clearly a step-like pulse. However, as discussed above, here it is the area under the curve (the total number of photons emitted) that represents the energy deposited in the scintillator, rather than the pulse amplitude as in other common detectors. As a result, the derivation of the weighting functions in the TCWFS-filter must be modified slightly from the derivation presented in §4. We therefore present it in compact form below.

Figure 15:
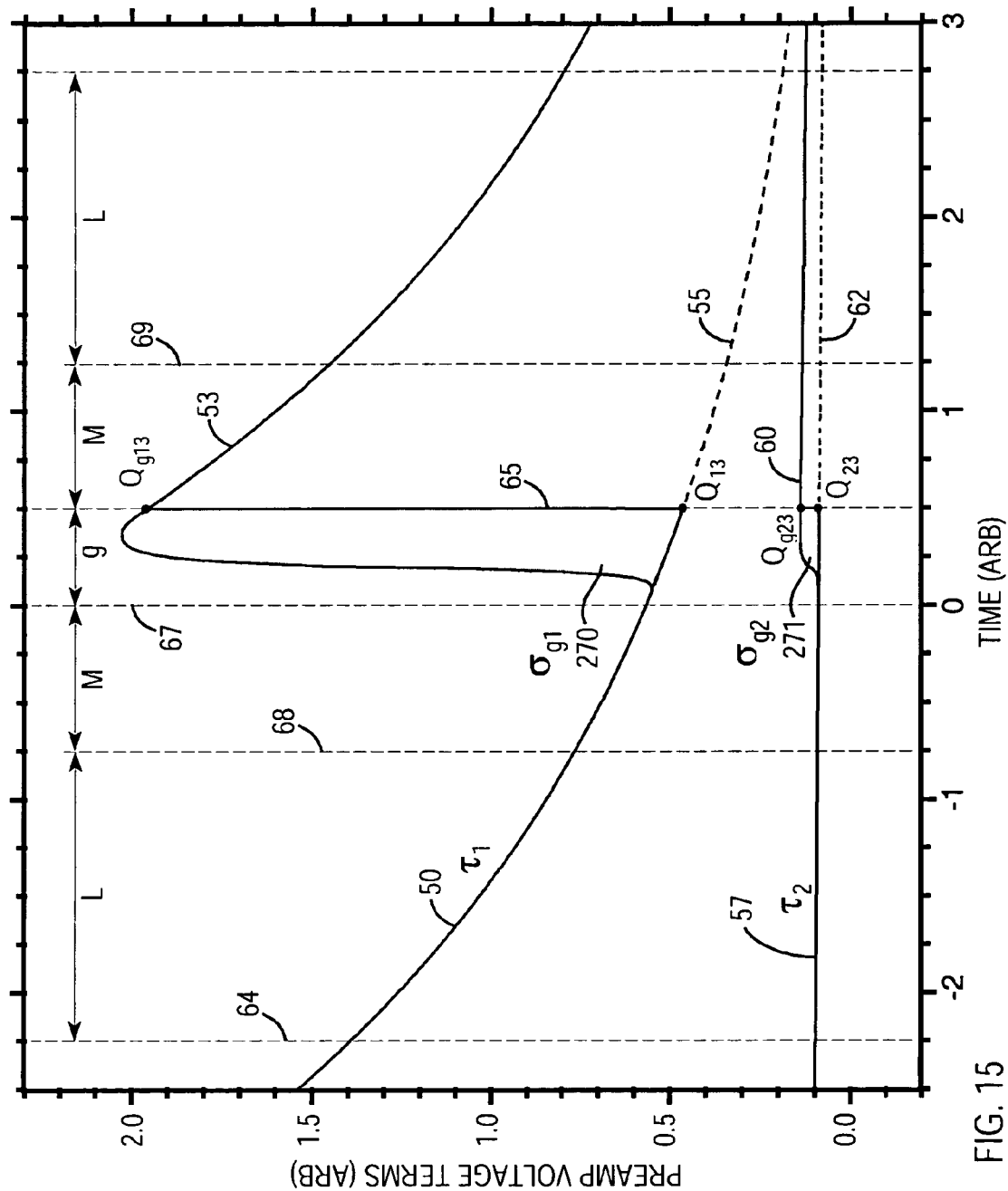
FIG. 15 shows a model of a scintillator output using two decay lifetimes.

We model the light output as a two-pole device, with two decay times $\tau_1$ and $\tau_2$ and two decay coefficients $b_1$ and $b_2$, per §4. The amplitudes $Q_{13}$ and $Q_{23}$ represent the residual amplitudes of these components from any preceding absorption events at time 3, following the gap period g. $Q_{g13}$ and $Q_{g23}$ represent the increases in the amplitudes of these terms at the same time instant. $\sigma_g$ is the light emitted during the signal's risetime in the gap period g and equals the sum of the light emitted by the two components, $\sigma_{g1}$ and $\sigma_{g2}$. For simplicity, only three filter lengths, L, M, and g, are used to implement the five running sum filters, as shown in FIG. 15. Given that the measured light output at time i is $y_i$, the outputs of the five running sum filters $\sigma_j$ are then:

$$\sigma_1 = Q_{13}b_1^{-(L+M+g)}A_{1L} + Q_{23}b_2^{-(L+M+g)}A_{2L} \quad (51a)$$

$$\sigma_2 Q_{13}b_1^{-(M+g)}A_{1M} + Q_{23}b_2^{-(M+g)}A_{2M} \quad (51b)$$

$$\sigma_3 = Q_{13}b_1^{-(g)}A_{1g} + Q_{23}b_2^{-(g)}A_{2g} + \sigma_g \quad (51c)$$

$$\sigma_4 = (Q_{13}+Q_{g13})A_{1L} + (Q_{23}+Q_{g23})A_{2L} \quad (51d)$$

$$\sigma_5 = (Q_{13}+Q_{g13})b_1^M A_{1L} + (Q_{23}+Q_{g23})b_2^M A_{2L} \quad (51e)$$

where the $A_{ij}$ terms have the same definitions as in § 4.

If we define $q_1 = \sigma_g$, $q_2 = Q_{g13}$, $q_3 = Q_{g23}$, $q_4 = Q_{13}$, and $q_5 = Q_{23}$, then, similarly to Eqns. 23a and 23b, we can write Eqn. 51 in matrix form and solve as:

$$\sigma = J \cdot q, \quad (52a)$$

so that $$q = J^{-1} \cdot \sigma, \quad (52b)$$

Now, the total emitted light, taken as a measure of the deposited energy $Q_{gT}$, can be expressed in the model parameters Q, where $r_1$ and $r_2$ have the same definitions as in §4, as:

$$Q_{gT} = \sigma_g + r_1 Q_{g13} + r_2 Q_{g23}. \quad (53)$$

What Eqn. 53 represents is our best estimate, using only filters of length g, M, and L, of the light that we would have obtained if we had actually integrated to infinity, rather than only over the finite time represented the filter lengths. We can replace the Q's from Eqn. 52 and collect terms to obtain:

$$Q_{gT} = \sum_{i=1}^{5} J_{1i}^{-1}\sigma_i + r_1 \sum_{i=1}^{5} J_{2i}^{-1}\sigma_i + r_2 \sum_{i=1}^{5} J_{3i}^{-1}\sigma_i, \text{ or} \quad (54a)$$

$$Q_{gT} = \sum_{i=1}^{5} [J_{1i}^{-1} + r_1 J_{2i}^{-1} + r_2 J_{3i}^{-1}]\sigma_i \equiv \sum_{i=1}^{5} W_i \sigma_i, \quad (54b)$$

where the $W_i$ values are the weighting coefficients to be applied to the 5 time correlated, filtered secondary signals that we derive from our three primary filters by appropriate delays. Thus $\sigma_1$ is a running average of length L, delayed by L+2M+g; $\sigma_2$ is a running average of length M, delayed by L+M+g; $\sigma_3$ is a running average of length g, delayed by L+M; $\sigma_4$ is a running average of length M, delayed by L; and $\sigma_5$ is a running average of length L with no delay.

Figure 16:
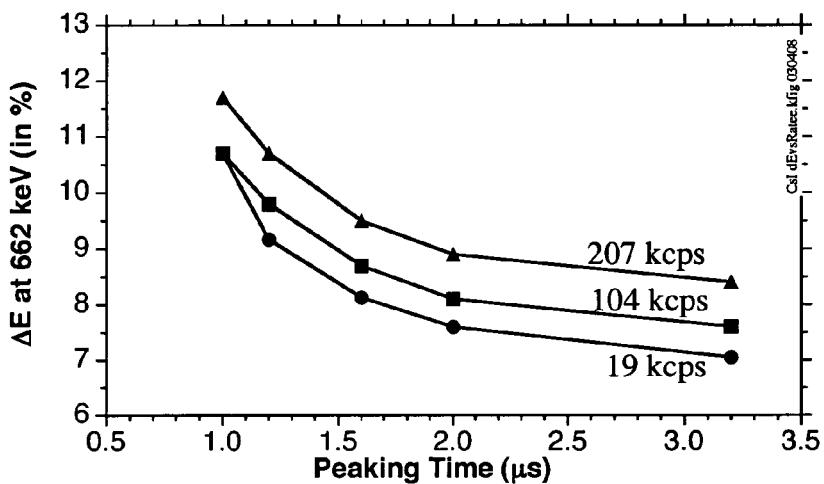
FIG. 16 shows the relative insensitivity of the energy resolution of a five term filter to count rate when working with signals of the type shown in FIG. 14.

The lengths L=1.6 μs, M=0.8 μs, and g=0.6 μs were found to work well. For example, 1.6 μs filter length (the "peaking time") was varied to see what its effect was on energy resolution and high rate performance. In all cases the correct weighting functions were computed for the filter lengths and CsI(T1) decay times using Eqns. 51–54. Results of energy resolution versus peaking time are shown in FIG. 16 for a 1" cubic scintillator exposed to $^{137}$Cs radiation at 662 keV. The energy resolutions obtained at 19 kcps are essentially identical to values obtained for a crystal of this size with traditional processing electronics. In contrast to earlier filtering methods, however, the energy resolution now degrades quite slowly with rate. At 3.2 μs peaking time, resolution increases only 10% (6.0 to 6.6%) going from 19 kcps to 104 kcps and only 7% (9.1 to 9.7%) at 1.2 μs peaking time. Slightly larger increases are found going to 207 kcps. These energy resolutions are still useable, however, and essentially extend the count rate capability of CsI(T1) by over an order of magnitude compared to earlier filtering methods.

Figure 17:
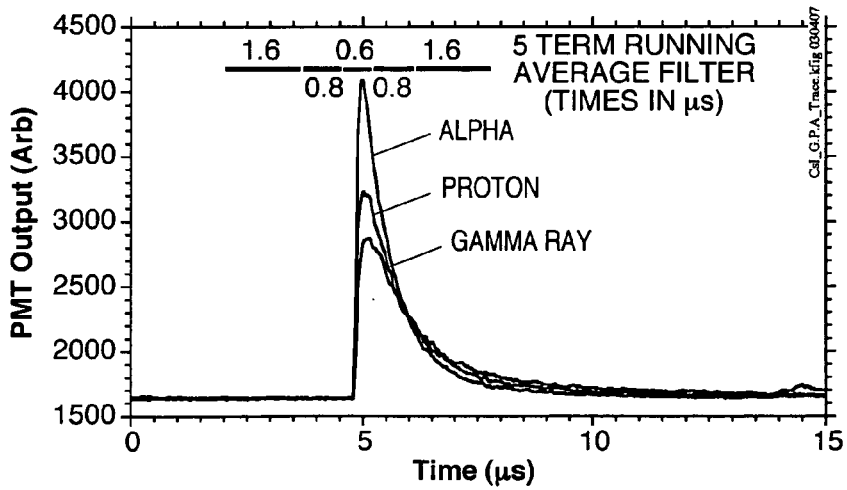
FIG. 17 shows the normalized output traces from the detector of FIG. 14 when exposed to a gamma-ray, a proton, and an alpha particle of equal energies.

Finally, it is also known that the amount of light CsI(T1) emits in its two decay components varies depending upon the identity of the particle depositing energy in the crystal. FIG. 17 shows typical traces from a gamma-ray, a proton, and an alpha particle depositing the same amount of energy in CsI(T1). The change in curve shape with particle identity allows "Particle ID" or PID schemes to be implemented, as described in [SKULSKI-2001] and elsewhere. A typical method is to compare the area under the first part of the curve (e.g. the first 1.5 µs) to the total area under the curve (e.g. its energy). Obviously, if the energy cannot be determined accurately at higher counting rates, because of the presence of two decay terms as discussed above, then the PID will not be accurate at higher counting rates either. The situation can be improved, therefore, by using an energy value determined by the TCWFS-filtering methods described herein.

In the process of solving for $Q_{gT}$, the TCWFS-filtering method also produces terms that can be directly used to implement PID. As a first example, if the ratio of light in the two decay modes is characteristic of the stimulating particle, then $Q_{g13}/Q_{g23}$ directly reflects this ratio and can be used as a PID parameter. Alternatively, since inverting matrix J introduces some correlation between $Q_{g13}$ and $Q_{g23}$, one can also compare the area under the early part of the light output curve to the total area. In this case $\sigma_g/Q_{gT}$ can be used as the PID parameter. The fourth filter, $\sigma_4$, also measures early light output, but it rides on the light output of any earlier events when operating at high count rates. However, once the vector Q has been found, it can then be corrected for this error by subtracting these terms to get the true area, $A_4$, under $\sigma_4$ arising from the new event, from Eqn. 51d:

$$A_4 = \sigma_4 - Q_{13}A_{1L} - Q_{23}A_{2L}, \quad (55)$$

allowing $A_4/Q_{gT}$ to be used as the PID parameter. Thus the TCWFS-filtering method also allows PID techniques to be extended to high counting rate situations.

11. REFERENCES

The following are incorporated by reference:

AALSETH-1998: "Using pulse shape discrimination to sort individual energy deposition events in a germanium crystal," C. E. Aalseth, F. T. Avignone III, R. L. Brodzinski, H. S. Miley, and J. H. Reeves in Journal of Radioanalytical and Nuclear Chemistry, Vol. 233, Nos 1–2 (1998) 119–123.
GOULDING-1988: "Ballistic Deficit Correction in Semiconductor Detector Spectrometers," F. S. Goulding and D. A. Landis, I.E.E.E. Trans. Nuclear Science, Vol. 35, No. 1, (1988) 119–124.
HINSHAW-1991: U.S. Pat. No. 5,021,664, issued Jun. 4, 1991 to S. M. Hinshaw for "Method and apparatus for correcting the energy resolution of ionizing radiation spectrometers."
KNOLL-1989: "Radiation Detection and Measurement, 2nd Ed." by Glenn F. Knoll (J. Wiley, New York, 1989)
KUMAZAWA-1988: U.S. Pat. No. 4,727,256, issued Feb. 23, 1988 to Y. Kumazawa for "Semiconductor radiation detector."
MILLER-1994: U.S. Pat. No. 5,347,129, issued Sept. 13, 1994 to W. H. Miller and R. R. Berliner for "System for determining type of nuclear radiation from detector output pulse shape."
RADEKA-1982: "Trapezoidal Filtering of Signals from Large Germanium Detectors at High Rates," V. Radeka, I.E.E.E. Trans. Nuclear Science, Vol. NS-19 (1982) 412–428.
RAUDORF-1982: "Pulse Shape and Risetime Distribution Calculations for HPGe Coaxial Detectors," T. W. Raudorf, M. O. Bedwell and T. J. Paulus, I.E.E.E. Trans. Nuclear Science, Vol. NS-29, No. 1 (1982) 764–768.
SIMPSON-1990: U.S. Pat. No. 4,937,452, issued Jun. 26, 1990 to M. L. Simpson and T. W. Raudorf for "Charge trapping correction in photon detector systems."
SKULSKI-2001: "Particle identification in CsI(Tl) using digital pulse shape analysis," W. Skulski & M. Momayezi, Nuclear Instruments and Methods in Physics Research, A458 (2001) 759–771.
STAHLE-1999: "Design and performance of the Astro-E/XRF microcalorimeter array and anti-coincidence detector," C. K. Stahle et al., in Proc. of the SPIE No. 3765, "EUV, X-ray and Gamma-ray Instrumentation for Astronomy X" (Denver, CO, July 21–23, 1999), in press.
TAKAHASHI-1994: "A Multiparametric Waveform Analysis of Ge Detector Signal Based on Fast ADC Digitizing Technique," by H. Takahashi, S. Kinjoh, J. Kawarabayashi, T. Iguchi, and M. Nakazawa, I.E.E.E. Trans. Nuclear Science, Vol. 41, No. 4, (1994) 1246–1249.
WARBURTON-1997: U.S. Pat. No. 5,684,850, issued Nov. 4, 1997 to W. K. Warburton and B. Hubbard for "Method and apparatus for digitally based high speed x-ray spectrometer."
WARBURTON-1998: U.S. Pat. No. 5,774,522, issued Jun. 30, 1998 to W. K. Warburton for "Method and apparatus for digitally based high speed x-ray spectrometer for direct coupled use with continuous discharge preamplifiers."
WARBURTON-1999: U.S. Pat. No. 5,873,054, issued Feb. 16, 1999 to W. K. Warburton and Z. Zhou for "Method and apparatus for combinatorial logic signal processor in a digitally based high speed x-ray spectrometer."
WHITE-1988: "Pulse Processing for Gamma Ray Spectrometry: a Novel Method and its Implementation," G. White, I.E.E.E. Trans. Nuclear Science, Vol. 35, No. 1, (1988) 125–130.

12. CONCLUSION

The foregoing description of specific embodiments has been presented for purposes of illustration and description. It is not intended to be exhaustive or to limit the invention to the precise forms described, and obviously, many modifications and variations are possible in light of the above teaching. These embodiments were chosen and described in order to best explain the principles of the invention and its practical application to thereby enable others in the art to best utilize the invention in various embodiments and with such modifications as best suit the invention to the particular uses contemplated.

As a first example, while all the described embodiments used trapezoidal, triangular, or running average filters, there is no such restriction in the technique. As shown, any filter describable by a set of weighting constants applied to successive signal samples, or its analog equivalent, can be used. The method will therefore work with essentially any realizable filter. Second, while the specific embodiments employed two, three, or four filters, there is no specific limit on the number of filters which can be used. Even a single filter can be used if its output is correctly sampled at several times. If the number of filters N exceeds the number of base amplitudes M, then matrix inversion methods can be used to find least squares best estimates of the M values, rather than exact values. Third, while all the filters used in the specific embodiments were symmetric, this is not a requirement of the method, as may be seen from the derivations. Fourth, while specific configurations of electronic circuits were shown in the implementations, other configurations can readily be devised which accomplish the same functions. The number of ADC bits or value lengths captured to the registers could be varied, for example. Fifth, even the use of electronic circuits is not required to implement the method. As per the initial derivations, for example, if successive ADC values are instead read into computer memory, all the subsequent processing steps can be carried out in software. Sixth, while all of the described embodiments used one or more explicit delay elements to create the desired time correlations between filter outputs, as we showed in § 9.5, it is not difficult to produce designs where delays implicit in the filters themselves can be made to serve this function. Seventh, in some cases an unfiltered sample of the primary signal, i.e. a unity filtered sample, may be one of the secondary-signals. Eighth, the method can also be applied to signals which are formally equivalent to outputs from multipole filters, whether the signal source is actually a single multi-pole filter or not. Superconducting bolometers and certain classes of scintillators produce such output signals, for example.

Therefore, the above description should not be taken as limiting the scope of the invention, as defined by the appended claims.

What is claimed is:

1. A method for measuring the integrated area $Q_{gT}$ of a pulse-like input signal applied to a device characterized by one or more decay time constants in said device's impulse response function by measuring a step-like output signal, referred to as the primary signal, provided by said device in response to said pulse-like input signal, the method comprising:
    creating a set of secondary signals by directing the primary signal into a plurality of signal paths;
    performing a filtering or delaying operation in at least one of said signal paths;
    applying a set of weighting coefficients to said secondary signals within said signal paths;
    summing said secondary signals to provide a time correlated, weighted filter sum signal; and
    performing at least one capturing operation after any filtering or delaying operations to produce a value of said time correlated, weighted filter sum signal, following said capturing and summing operations, that is a measure of said integrated area $Q_{gT}$ of said input signal;
    wherein said filtering, delaying and/or capturing operations establish a defined time correlation between said secondary signals with respect to one another prior to said secondary signals being summed; and
    wherein said weighting coefficients applied to the secondary signals are selected, based on the nature of any filters used in said filtering operations, on the defined time correlation established between said secondary signals, and on the values of the one or more decay time constants associated with said device, to compensate said measured area $Q_{gT}$ for the risetime structure of said step-like pulse, for the presence of more than one decay time constant, or for both.

2. The method of claim 1 wherein said secondary signals are all summed at a single summation point.

3. The method of claim 1 wherein said secondary signals are summed at a plurality of summation points.

4. The method of claim 1 wherein, for at least one secondary signal the application of the weighting coefficient occurs prior to the performance of a filtering or delaying operation.

5. The method of claim 1 wherein, for at least one secondary signal, the performance of the filtering operation occurs prior to the performance of a delaying operation or the application of a weighting coefficient.

6. The method of claim 1 wherein, for at least one secondary signal, the performance of the delaying operation occurs prior to the performance of a filtering operation or the application of a weighting coefficient.

7. The method of claim 1 wherein, for at least one secondary signal, a first filter with a shorter time domain plus a delay are replaced by a second filter whose time domain is approximately equal to the length of the time domain of the first filter plus the length of the replaced delay and said weighting coefficients are adjusted accordingly.

8. The method of claim 1 wherein, for at least one secondary signal, said filtering operation also includes a decimation operation.

9. The method of claim 1 wherein said at least one capturing operation is performed after said summing operation.

10. The method of claim 9 wherein said capturing operation is performed in response to the detection of a maximum in the summed signal.

11. The method of claim 1 wherein:
    said capturing operation includes capturing one or more of said secondary signals following any filtering or delaying operations in their associated signal paths; and
    said secondary signals that are summed are captured values of said one or more secondary signals propagating along said associated signal paths.

12. The method of claim 11 wherein said weighting coefficients are applied to said captured values of said one or more secondary signals prior to summing said captured values.

13. The method of claim 11 wherein said weighting coefficients are applied to said one or more secondary signals prior to said to capturing operation.

14. The method of claim 13 wherein, for at least one of said one or more secondary signals propagating in their associated signal paths, the application of the weighting coefficient occurs prior to the performance of a filtering or delaying operation.

15. The method of claim 11 wherein said capturing one or more secondary signals includes capturing the entire set of secondary signals.

16. The method of claim 11 wherein said delaying operation is carried out for at least a first secondary signal by delaying the first secondary signal's time of capture relative to the time of capture of a second secondary signal.

17. The method of claim 11 wherein said delaying operation is carried out for at least a first captured secondary signal by introducing a propagation delay into first secondary signal's associated signal path that is different from the propagation delay in the associated signal path of a second captured secondary signal.

18. The method of claim 17 wherein said introduced propagation delay is adjusted so that said capturing of said first and second captured secondary signals are carried out simultaneously.

19. The method of claim 1 wherein said capturing operation is carried out in response to detecting a step-like feature in said primary signal.

20. The method of claim 19 wherein said capturing operation includes measuring one or more predetermined times after said detecting a step-like feature and capturing one or more secondary signals or said summed signal at the end of said one or more predetermined times.

21. The method of claim 19 wherein said capturing operation includes measuring a first predetermined time after said detecting a step-like feature and then detecting and capturing the peak value of said summed signal that occurs within a second predetermined time interval.

22. The method of claim 19, and further comprising recording the time at which said step-like feature is detected.

23. The method of claim 19 wherein said detected step-like feature is inspected for pileup and said capturing operation is carried out only if said detected step-like feature is not piled-up.

24. The method of claim 1 wherein said summed signal is compared to a threshold value and said capturing operation is only initiated if the summed signal exceeds the threshold value.

25. The method of claim 1 wherein multiple secondary signal paths share the same filtering operation.

26. The method of claim 1 wherein at least one secondary signal path does not contain a filtering operation, so that the secondary signal being summed after traveling along this signal path is a weighted copy of said primary signal.

27. The method of claim 1 wherein, in at least one secondary signal path, an analog-to-digital conversion (ADC) operation is carried out following one or more of said filtering, delaying, or weighting operations, and the remaining filtering, delaying, or weighting operations are carried out digitally.

28. The method of claim 27 wherein, in those secondary paths where filtering operations are carried out by digital means, at least one running average filter is employed.

29. The method of claim 1 wherein multiple secondary signal paths share an ADC operation by applying said ADC operation to the primary signal and then directing the resultant digitized primary signal into said multiple secondary signal paths.

30. The method of claim 1 wherein at least one trapezoidal or triangular digital filter is employed.

31. The method of claim 30 wherein, when a trapezoidal digital filter is employed the sensitivity of its contribution to said captured, weighted signal sum value on the risetime structure of said step-like pulse is reduced by making the trapezoidal digital filter gap length longer than the longest expected step-like pulse risetime.

32. The method of claim 1 wherein said pulse-like input signal has a finite time extent, a time-varying amplitude, or both.

33. The method of claim 1 wherein said filtering, delaying, weighting, and summing operations are all performed continuously, so that said sum of time correlated, weighted, filtered signals is also a continuous signal.

34. The method of claim 1 wherein one or more of said filtering, delaying, or weighting operations is carried out using analog circuitry.

35. The method of claim 1 wherein said weighting coefficients are calculated for a selected set of filtering and delaying operations by:
developing a mathematical model of said device's response to said pulse-like input signal in terms of:
i) a set of one or more first type (type $P_1$) parameters that characterize said device's amplitude response to said pulse-like input signal;
ii) a set of one or more second type (type $P_2$) parameters that characterize said device's residual amplitude response to any previous pulse-like input signals; and
iii) a set of one or more third type (type $P_3$) parameters that characterize the transfer functions of said device and of said filtering and delaying operations;
convolving said modeled response by said delaying and filtering operations to produce a set of linear equations between the unweighted contributions from said secondary signal paths to said captured weighted signal sum value and said sets of type $P_1$ and type $P_2$ parameters;
solving said set of linear equations for the values of said $P_1$ and $P_2$ parameters in terms of said unweighted contributions; and
expressing the desired integrated area $Q_{gT}$ in terms of said type $P_1$ and type $P_2$ parameters to obtain an integrated area equation relating $Q_{gT}$ to the values of said unweighted contributions, where the coefficients of said unweighted contributions in said integrated area equation are the desired weighting coefficients.

36. The method of claim 1 wherein said device has a DC offset or a minor higher-order pole term in its output, and further comprising:
directing baseline secondary signals to a baseline summation point along baseline secondary signal paths providing filtering, delaying, or weighting operations;
making baseline measurements by capturing weighted baseline sum values from said baseline summation point at times when said baseline secondary signals reaching said baseline summation point are not responding to step-like features in said primary signal; and
using one or more of said baseline measurements to correct said measurement of said integrated area $Q_{gT}$ for the presence of said DC offset or said minor higher order pole term, or both.

37. The method of claim 36 wherein said baseline secondary signals and said secondary signals are summed at the same point, and the same secondary signal paths contribute to both the weighted signal sum values and weighted baseline sum values.

38. The method of claim 36 wherein said baseline secondary signals and said secondary signals are summed at different points, and different secondary signal paths contribute to said weighted signal sum values than contribute to said weighted baseline sum values.

39. The method of claim 38 wherein some secondary signal paths are directed to both of the different points.

40. The method of claim 36 wherein the number of poles is 2, with said minor higher order pole being the second order pole.

41. The method of claim 36 wherein said baseline measurements are scaled according to the time decay behavior of said minor higher order pole before being used to make said correction of said measurement of integrated area $Q_{gT}$.

42. The method of claim 41 wherein said scaling is accomplished by multiplying said measurements by factors of the form $\exp(-\Delta t/\tau_m)$, where $\tau_m$ is the decay constant of the minor pole and $\Delta t$ is the time between successive baseline measurements or the time between the last baseline measurement and said time of capturing said weighted signal sum value as a measure of said integrated area $Q_{gT}$.

43. The method of claim 36 wherein multiple baseline measurements are made and averaged prior to being used to make said correction.

44. The method of claim 43 wherein said baseline measurements are only used to correct for a DC offset and said multiple baseline measurements are averaged using a running sum average.

45. The method of claim 43 wherein said baseline measurements are only used to correct for a DC offset and said multiple baseline measurements are averaged using an exponentially decaying average of the form $<b>_i=(N-1)*<b>_{i-1}/N+b_i/N$, where
$b_i$ is the $i^{th}$ baseline measurement, $<b>_i$ is the $i^{th}$ baseline average, and N is a constant.

46. The method of claim 43 wherein said multiple baseline measurements, after correction for the DC offset, are averaged using an exponentially decaying average of the form $<b>_i=(N-1)*\exp(-\Delta t_i/\tau_m)<b>_{i-1}/N+b_i/N$, where
$b_i$ is the $i^{th}$ baseline measurement, $<b>_i$ is the $i^{th}$ baseline average, N is a constant, and $\Delta t_i$ is the time between the $i^{th}$ baseline measurement and its predecessor.

47. The method of claim 46 wherein estimated values of the DC offset used in making said correction for DC offset are obtained from time to time by:
first, measuring a pair of said baseline values without an intervening step-like pulse, and,
second, computing a weighted difference of said pair of values.

48. The method of claim 36 wherein values of $Q_{gT}$ for previously detected step-like pulses are also used to correct said integrated area $Q_{gT}$ for the presence of said minor higher order pole term.

49. The method of claim 1 wherein said multi-pole device is a preamplifier having one or more decay constants and said integrated area $Q_{gT}$ of a pulse-like signal input to the preamplifier represents the charge produced in a detector attached to the preamplifier due to an absorption event in said detector.

50. The method of claim 49 wherein said preamplifier has only two poles, namely a major first pole and a minor second pole, so that said preamplifier is a nominally single-pole (N-1P) device.

51. The method of claim 50 wherein said weighting coefficients are selected to compensate said measurement of charge $Q_{gT}$ for at least the presence of said minor second pole.

52. The method of claim 50 wherein said weighting coefficients are selected ignoring the presence of said minor second pole, and baseline measurements are used to correct the measurement of charge $Q_{gT}$ for the presence of said minor second pole or said DC offset, or both.

53. The method of claim 1 wherein said device is a superconducting bolometer having one or more decay constants and said integrated area $Q_{gT}$ of a pulse-like signal input to the preamplifier represents the heat released in a detector attached to the preamplifier due to an absorption event in said detector.

54. The method of claim 1 wherein said device is a scintillator material having one or more decay constants, said step-like pulse output is the light emitted by the scintillator material in response to an absorption event, and said integrated area $Q_{gT}$ of a pulse-like input signal represents the energy deposited in the scintillator material by said absorption event.

55. The method of claim 54 wherein said energy $Q_{gT}$ is assumed to be proportional to the total light output by said scintillator material in response to said absorption event, said total light output being proportional to the total area under said step-like pulse output signal.

56. The method of claim 54 wherein said weighting coefficients are calculated for a selected set of filtering and delaying operations by:
developing a mathematical model of said scintillator material's response to said deposited energy in terms of:
i) a first type (type $\sigma_g$) parameter equal to the area under said step-like pulse in a risetime region;
ii) a set of one or more second type (type $Q_{gi3}$) parameters that characterize the increase in the amplitudes of one or more exponential decay terms immediately following said risetime region;
iii) a set of one or more third type (type $Q_{i3}$) parameters that characterize the residual amplitudes of said one or more exponential decay terms due to any previous energy depositions; and
iv) a set of one or more fourth type (type $P_4$) parameters that characterize said scintillator's one or more exponential decay times $\tau_i$ and said filtering and delaying operations;
convolving said modeled response by said delaying and filtering operations to produce a set of linear equations between the unweighted contributions ($\sigma_i$) from said secondary signal paths to said captured weighted signal sum value and said sets of type $\sigma_g$, type $Q_{gi3}$, and type $Q_{i3}$ parameters;
solving said set of linear equations for the values of said type $\sigma_g$, type $Q_{gi3}$, and type $Q_{i3}$ parameters in terms of said unweighted contributions $\sigma_i$;
expressing the desired deposited energy type $Q_{gT}$ in terms of said type $\sigma_g$, type $Q_{gi3}$, and type $Q_{i3}$ parameters as $Q_{gT}=\sigma_g+\Sigma A_i Q_{gi3}$ where $A_i$ is the area under an exponential decay of unit amplitude, integrated to infinity; and
substituting from said set of solved linear equations to obtain $Q_{gT}$ in terms of said unweighted contributions $\sigma_i$ as:

$Q_{gT}=\Sigma w_i \sigma_i$, where the coefficients $w_i$ of said unweighted contributions $\sigma_i$ are the desired weighting coefficients.

57. A method for measuring the integrated area $Q_{gT}$ of a pulse-like input signal applied to a device characterized by one or more decay time constants in said device's impulse response function by measuring a step-like output signal, referred to as the primary signal, provided by said device in response to said pulse-like input signal, the method comprising:

creating a set of secondary signals by directing the primary signal into a plurality of signal paths connecting to one or more signal summation points;

performing a filtering or delaying operation in at least one of said signal paths;

applying a set of weighting coefficients to said secondary signals within said signal paths;

summing said secondary signals at said one or more signal summation points to provide a time correlated, weighted filter sum signal; and performing at least one capturing operation after any filtering or delaying operations to produce a value of said time correlated, weighted filter sum signal, following said capturing and summing operations, that is a measure of said integrated area $Q_{gT}$ of said input signal;

wherein said filtering, delaying and/or capturing operations establish a defined time correlation between said secondary signals with respect to one another prior to reaching said one or more summation points; and wherein said weighting coefficients applied to the secondary signals are selected, based on the nature of any filters used in said filtering operations, on the defined time correlation established between said secondary signals, and on the values of the one or more decay time constants associated with said device, to compensate said measured area $Q_{gT}$ for the risetime structure of said step-like pulse, for the presence of more than one decay time constant, or for both.

58. Apparatus for measuring the integrated area $Q_{gT}$ of a pulse-like input signal applied to a device characterized by one or more decay time constants in said device's impulse response function by measuring a step-like output signal, referred to as the primary signal, provided by said device in response to said pulse-like input signal, the apparatus comprising:

a plurality of signal paths that receive the primary signal, the signals traveling along said signal paths being referred to as secondary signals;

at least one filter and/or delay element in at least one of said signal paths;

weighting circuitry that performs a weighting function on said secondary signals within said signal paths;

summing circuitry that sums said secondary signals to provide a time correlated, weighted filter sum signal; and capturing circuitry that captures said secondary signals after said secondary signals have encountered any filter or delay element in said signal paths to produce a value of said time correlated, weighted filter sum signal, following capturing and summing, that is a measure of said integrated area $Q_{gT}$ of said input signal;

wherein said at least one filter and/or delay element and/or said capturing circuitry establish a defined time correlation between said secondary signals with respect to one another prior to said secondary signals being summed; and wherein said weighting coefficients applied to the secondary signals are selected, based on the nature of any filters used in said signal paths, on the defined time correlation established between said secondary signals, and on the values of the one or more decay time constants associated with said device, to compensate said measured area $Q_{gT}$ for the risetime structure of said step-like pulse, for the presence of more than one decay time constant, or for both.

59. The apparatus of claim 58 wherein said summing circuitry sums said secondary signals at a single summation point.

60. The apparatus of claim 58 wherein said summing circuitry sums said secondary signals at a plurality of summation points.

61. The apparatus of claim 58 wherein at least one secondary signal encounters said weighting circuitry prior to encountering a filter or delay element in that secondary signal's respective signal path.

62. The apparatus of claim 58 wherein at least one secondary signal encounters a filter prior to encountering a delay element or said weighting circuitry in that secondary signal's respective signal path.

63. The apparatus of claim 58 wherein at least one secondary signal encounters a delay element prior to encountering a filter or said weighting circuitry in that secondary signal's respective signal path.

64. A method for determining the integrated area $Q_{gT}$ of a pulse-like input signal by measuring a step-like output signal provided by a device in response to said pulse-like input signal, the method comprising:

applying a filter set having one or more filters to said device output;

detecting the presence of a step-like feature in said output signal;

in response to detecting said feature, capturing a set of correlated multiple output sample values (the area cMOS) from one or more filters in said filter set; and forming a weighted sum of the sample values in said area cMOS to determine said integrated area $Q_{gT}$ (the determined area) of said input signal;

wherein the weights in said sum (the area weights) are selected to compensate said determined area for errors arising either from the time structure of said pulse-like input, or from deviations in the device's response from an ideal single-pole response, or from both.

65. The method of claim 64 wherein said pulse-like input signal has a finite time extent and a time-varying amplitude.

66. Apparatus for measuring a step-like output signal from a device in response to a pulse-like input signal to determine the integrated area $Q_{gT}$ of said pulse-like input signal, the apparatus comprising:

a set of one or more filters applied to the device output (the area filter set);

circuitry that detects the presence of a step-like signal in said output signal;

circuitry that captures a correlated multiple output sample (the area cMOS) from said area filter set in response to said detection event;

circuitry that forms a weighted sum of the values in said area cMOS to determine said integrated area $Q_{gT}$ (the determined area) of said pulse-like input signal;

wherein the weights in said sum (the area weights) are selected to compensate said area determination for errors arising either from the time structure of said pulse-like input signal, or from deviations in the devices's response from an ideal single pole response, or from both.

67. The apparatus of claim 66 wherein:

said device output is digitized by an analog to digital converter;

said filters in said area filter set are digital filters;

said circuitry that captures include digital registers into which the digital outputs of said filters are captured;

said circuitry that forms a weighted sum to determine said integrated area $Q_{gT}$ includes a digital computing device that reads the values captured in said registers, multiplies each such value by an appropriate weighting constant, and adds them together to compute said integrated area $Q_{gT}$.

68. The apparatus of claim 66 wherein:

said device is a charge sensitive preamplifier;

said pulse-like input is from a radiation detector following a radiation absorption event; and said determined integrated area $Q_{gT}$ represents the energy deposited in said detector by said absorption event.

69. A method for measuring the integrated area $Q_{gT}$ of a pulse-like signal input to a device characterized by one or more decay time constants in its impulse response function by measuring a step-like pulse output signal, referred to as the primary signal, provided by said device in response to said pulse-like input signal, the method comprising:

creating a set of secondary signals by directing the primary signal along a plurality of signal paths;

performing a filtering or delaying operation in one or more of said signal paths so that the secondary signals reaching the ends of said signal paths have a defined time correlation with respect to one another;

performing one or more capturing operations at the end of each of said signal paths to create a correlated multiple output sample (CMOS) set of secondary signal values;

applying a set of weighting coefficients to said CMOS set of captured secondary signal values;

summing said set of weighted CMOS values to provide a measure of said integrated area $Q_{gT}$ of said input signal;

wherein the weighting coefficients applied to said CMOS set of captured secondary signal values are selected, based on the nature of any filters used in said filtering operations, on any delays introduced in said delaying operations, and on the values of the one or more decay time constants associated with the device, to compensate said measured area for the risetime structure of said step-like pulse, for the presence of more than one decay time constant, or for both.

70. The method of claim 69 wherein, for at least one secondary signal propagating in its associated signal path, the performance of the filtering operation occurs prior to the performance of a delaying operation or the application of a weighting coefficient.

71. The method of claim 69 wherein:

said primary signal is digitized by an analog-to-digital converter;

said filtering and delaying operations are carried out digitally;

digital registers are used in said capturing operations; and the determination of said integrated area $Q_{gT}$ of said input signal is carried out by a digital computing device that reads the values captured in said registers, multiplies each such value by a weighting coefficient, and adds them together.

72. The method of claim 69 wherein said delaying operation is carried out for at least a first secondary signal by delaying its time of capture relative to the time of capture of a second secondary-signal.

73. The method of claim 69 wherein said delaying operation is carried out for at least a fir captured secondary signal by introducing a propagation delay into its associated signal path that is different from the propagation delay in the associated signal path of a second captured secondary signal.

74. The method of claim 69 wherein said capturing operation is carried out in response to detecting a step-like feature in said primary signal.

75. The method of claim 74 wherein said capturing operation includes measuring one or more predetermined times after said detecting a step-like feature and capturing one or more secondary signals at the end of said one or more predetermined times.

76. The method of claim 69 wherein one or more of said filtering, delaying or weighting operations is carried out using analog circuitry.

77. The method of claim 69 wherein said weighting coefficients are calculated for a selected set of filtering and delaying operations by:

developing a mathematical model of said device's response to said pulse-like input signal in terms of:

i) a set of one or more first ($P_1$) parameters that characterize said device's amplitude response to said pulse-like input signal;

ii) a set of one or more second ($P_2$) parameters that characterize said device's residual amplitude response to any previous pulse-like input signals;

iii) a set of one or more third ($P_3$) parameters that characterize the transfer functions of said device and of said filtering and delaying operations;

convolving said modeled response by said delaying and filtering operations to produce a set of linear equations between the unweighted contributions from said secondary signal paths to said captured weighted signal sum value and said sets of $P_1$ and $P_2$ parameters;

solving said set of linear equations for the values of said $P_1$ and $P_2$ parameters in terms of said unweighted contributions;

expressing the desired integrated area $Q_{gT}$ in terms of said $P_1$ and $P_2$ parameters to obtain an integrated area equation relating $Q_{gT}$ to the values of said unweighted contributions;

where the coefficients of said unweighted contributions in said integrated area equation are the desired weighting coefficients.

* * * * *